(12) United States Patent
Tsuchiya et al.

(10) Patent No.: US 9,526,393 B2
(45) Date of Patent: Dec. 27, 2016

(54) CLEANING ELEMENT AND CLEANING TOOL

(71) Applicant: UNI-CHARM CORPORATION, Ehime (JP)

(72) Inventors: Akemi Tsuchiya, Kanonji (JP); Yoshinori Tanaka, Kanonji (JP)

(73) Assignee: UNICHARM CORPORATION, Ehime (JP)

( * ) Notice: Subject to any disclaimer, the term of this patent is extended or adjusted under 35 U.S.C. 154(b) by 0 days.

(21) Appl. No.: 14/092,272

(22) Filed: Nov. 27, 2013

(65) Prior Publication Data

US 2014/0082872 A1    Mar. 27, 2014

Related U.S. Application Data

(63) Continuation of application No. 13/569,739, filed on Aug. 8, 2012, now Pat. No. 8,621,704, which is a (Continued)

(30) Foreign Application Priority Data

Sep. 12, 2006    (JP) .................................. 2006-247215

(51) Int. Cl.
*A47L 13/16*    (2006.01)
*A47L 13/38*    (2006.01)
(Continued)

(52) U.S. Cl.
CPC ................ *A47L 13/16* (2013.01); *A47L 13/20* (2013.01); *A47L 13/38* (2013.01); *A47L 13/46* (2013.01)

(58) Field of Classification Search
CPC ........... A47L 13/16; A47L 13/20; A47L 13/38
(Continued)

(56) References Cited

U.S. PATENT DOCUMENTS 6,813,801 B2    11/2004 Tanaka et al.
2004/0034956 A1    2/2004 Tanaka et al.
(Continued)

FOREIGN PATENT DOCUMENTS

CN        101291611        10/2008
EP         1731076          12/2006
(Continued)

OTHER PUBLICATIONS

Japanese Office Action for Application No. 2010-186229 mailed Feb. 29, 2012.
(Continued)

*Primary Examiner* — Mark Spisich
(74) *Attorney, Agent, or Firm* — Hauptman Ham, LLP

(57) ABSTRACT

A cleaning element includes a fiber assembly having a plurality of fibers extending in a predetermined direction and a nonwoven fabric provided on the fiber assembly. A first fusion bonded part extends in a cross direction traversing the predetermined direction to fusion-bond the fiber assembly and the nonwoven fabric, and a plurality of second fusion bonded parts is provided discontinuously in the cross direction to fusion-bond the fiber assembly and the nonwoven fabric. Each of the second fusion bonded parts has a first area and a second area. A length in the predetermined direction from the first fusion bonded part to the first area is different from a length in the predetermined direction from the first fusion bonded part to the second area.

30 Claims, 19 Drawing Sheets

Related U.S. Application Data continuation of application No. 12/440,944, filed as application No. PCT/JP2007/067228 on Sep. 4, 2007, now Pat. No. 8,245,349.

(51) Int. Cl.
*A47L 13/20* (2006.01)
*A47L 13/46* (2006.01)

(58) Field of Classification Search
USPC .............. 15/208, 209.1, 226, 229.3, 229.4, 229.7,15/229.8
See application file for complete search history.

(56) References Cited

U.S. PATENT DOCUMENTS

| | | |
|---|---|---|
| 2005/0039285 A1 | 2/2005 | Tanaka et al. |
| 2006/0101601 A1 | 5/2006 | Fujiwara et al. |
| 2006/0282969 A1 | 12/2006 | Yamada |
| 2009/0049633 A1 | 2/2009 | Takabayashi et al. |

FOREIGN PATENT DOCUMENTS

| | | |
|---|---|---|
| JP | 09024010 | 1/1997 |
| JP | 09154791 | 6/1997 |
| JP | 2002369783 | 12/2002 |
| JP | 2004167274 | 6/2004 |
| JP | 2005169148 | 6/2005 |
| JP | 2006034990 | 2/2006 |
| JP | 2006141483 | 6/2006 |
| JP | 2007111297 | 5/2007 |
| WO | 2005099549 | 10/2005 |
| WO | 2006070502 | 7/2006 |
| WO | 2008032612 A1 | 3/2008 |

OTHER PUBLICATIONS

Office Action for Chinese Application No. 200780033710.2 mailed Jun. 24, 2010.
Japanese Office Action for Application No. 2006-247215 mailed Jun. 25, 2010.
European Search Report for EP07806683, dated Oct. 21, 2009.
International Search Report for Application No. PCT/JP2007/067228 mailed Oct. 30, 2007.
Extended European Search Report for 10171437.6 dated Dec. 6, 2010.

CLEANING ELEMENT AND CLEANING TOOL

RELATED APPLICATIONS

This is a continuation of U.S. application Ser. No. 13/569,739, filed on Aug. 8, 2012 and issues as U.S. Pat. No. 8,621,704, which is a continuation of U.S. application Ser. No. 12/440,944 filed Mar. 12, 2009 and issued as U.S. Pat. No. 8,245,349. U.S. application Ser. No. 12/440,944 is the US national phase of International Application Number PCT/JP2007/067228, filed Sep. 4, 2007 and claims priority from, Japanese Application Number 2006-247215, filed Sep. 12, 2006. The disclosures of all of above-listed applications are hereby incorporated by reference herein in their entirety.

BACKGROUND OF THE INVENTION

Field of the Invention

The present invention relates to a cleaning tool and more particularly, to a cleaning tool having a sheet-type cleaning element for cleaning a face to be cleaned inside a room or a vehicle.

Description of the Related Art

Various types of cleaning tools with a sheet-type cleaning element are known for wiping an object to be cleaned. For example, Japanese non-examined laid-open Patent Publication No. 9-154791 discloses a cleaning tool having cleaning fabric and a holder that detachably holds the cleaning fabric inserted into a holding region of the cleaning fabric. While the known cleaning tool is capable of wiping a face to be cleaned by using the cleaning fabric held via the holder, it is required to provide a further effective technique for enhancing cleaning effect.

SUMMARY OF THE INVENTION

Accordingly, it is an object of the present invention to provide effective technique for a higher cleaning effect and higher operability of a cleaning element.

The above-described object is achieved by claimed invention. As one aspect of the invention, a cleaning element is provided which may be applied to faces to be cleaned such as floors, walls, ceilings, external walls, furniture, clothes, curtains, bedding, home electric appliances and so on inside and outside of houses, apartments, buildings, factories, vehicles, etc. These faces to be cleaned may be either flat or curved, uneven or stepped.

The cleaning element according to this invention includes at least a fiber assembly, a nonwoven fabric, a first fusion bonded part and a plurality of second fusion bonded parts.

According to the invention, the fiber assembly comprises a plurality of fibers extending in a predetermined direction. Preferably, the fiber assembly may have a planar structure having a predetermined flat or curved surface and has a three-dimensional form having a certain thickness or has a thin sheet-like form.

The "fibers" in this invention are elements of yarn, textile or the like and defined as being thin and flexible fibers having a substantially longer length compared with the thickness. Typically, a long continuous fiber is defined as a filament and a short fiber as a staple.

Further, the "fiber assembly" in this invention is a single fiber structure formed by the above-mentioned fibers, a fiber structure having the above-mentioned fibers aligned in the length direction and/or the radial direction (twist yarn, spun yarn, yarn to which a plurality of filaments are partially connected), or an assembly of the fiber structures.

Typically, the fiber assembly is formed of polyethylene (PE), polypropylene (PP), polyethylene terephthalate (PET), nylon, rayon or the like. In practical use, an assembly of filaments formed by opening a tow is frequently used as the fiber assembly.

In this invention, a sheet-like nonwoven fabric is disposed on the fiber assembly. The nonwoven fabric may comprise a single nonwoven fabric sheet layer or a plurality of nonwoven fabric sheet layers having the same or different functions and stacked in layer. The "nonwoven fabric" in this invention has a sheet-like configuration formed by fixing or entangling fibers by mechanical, chemical or heat treatment. Typically, the nonwoven fabric partly includes thermal melting fibers (thermoplastic fibers) and thus can be fusion bonded.

The first fusion bonded part of this invention extends in a direction crossing the predetermined direction in order to fusion bond the fiber assembly and the nonwoven fabric. It is essential for the first fusion bonded part in this invention to extend in a direction crossing the predetermined direction. Therefore, the configuration of the first fusion bonded part may include a configuration having a continuously linearly extending bonded portion and a configuration having a discontinuously extending bonded portion.

The plurality of the second fusion bonded parts are formed discontinuously in a direction crossing the predetermined direction in order to fusion bond the fiber assembly. It is essential for the second fusion bonded parts in this invention to be formed discontinuously in a direction crossing the predetermined direction. Therefore, the configuration of the second fusion bonded parts may include a configuration having a plurality of bonded portions aligned on the same line and a configuration having a plurality of bonded portions not aligned on the same line.

A distance between adjacent ones of the second fusion bonded parts which are provided in the middle of the cleaning element in the direction crossing the predetermined direction is longer than a length of unbonded portions that are formed on both sides of the pair adjacent second fusion bonded parts. In a construction in which two additional second fusion bonded parts are provided on the both sides of the pair adjacent second fusion bonded parts, the "unbonded portions" may be defined as the regions between the adjacent second fusion bonded parts and the additional second fusion bonded parts. Further, in a construction in which no additional second fusion bonded parts are provided on the both sides of the pair adjacent second fusion bonded parts, the "unbonded portions" here are defined as the regions between the adjacent second fusion bonded parts and the ends of the cleaning element.

Fibers between the adjacent second fusion bonded parts provided in the middle of the cleaning element serve as a main cleaning part for trapping dust, and fibers of the unbonded portion formed on both sides of the pair adjacent second fusion bonded parts serve as an auxiliary cleaning part for trapping dust. Further, in this invention, one or more pairs of the adjacent second fusion bonded parts may be provided in the middle (a region covering the central portion and an area on its both sides) of the cleaning element in the direction crossing the predetermined direction.

Further, in this invention, the fiber assembly includes a first fiber extending part and a second fiber extending part. The first fiber extending part has fibers which extend from one end fixed at the first fusion bonded part to the other free end on the end of the cleaning element in the predetermined direction. The second fiber extending part has fibers which extend from one end fixed at the second fusion bonded parts to the other free end on the end of the cleaning element in the predetermined direction. The first fusion bonded part and the second fusion bonded parts are located such that a fiber extending length of the second fiber extending part is shorter than a fiber extending length of the first fiber extending part.

With such construction of the cleaning element according to this invention, fibers joined to the sheet-type nonwoven fabric form a horizontal section having a relatively high bond strength between the first fusion bonded part and the second fusion bonded parts. Further, with the construction having this horizontal section, the cleaning element can easily conform to a horizontal face to be cleaned, during cleaning operation. Thus, this construction is effective in enhancing the cleaning effect.

Further, according to this invention, when the cleaning element is lightly shaken or broken up into pieces by the user such that air is taken into the fiber assembly, fibers of the first fiber extending part which have a relatively long length in the fiber assembly are easily entangled with each other and depend downward.

On the other hand, fibers of the second fiber extending part which have a relatively short length in the fiber assembly are not easily entangled with the first fiber extending part. Therefore, when air is taken into the fiber assembly, the fiber assembly is held homogeneous with a limited amount of unnecessary voids, and the fiber assembly is wholly densely spread. Thus the volume of the fiber assembly is increased. This state in which the fibers have a high density and are homogeneous can be defined as providing a high voluminous feeling, and also referred to as a "bulky state", "volume increased state", "high space-fullness state" or "bulk-up state". Therefore, the cleaning effect can be enhanced by increasing the volume of the fiber assembly. Further, due to the volume increase, the fiber assembly makes closer contact with a face to be cleaned. Therefore, dirt of the fiber assembly stands out (the fiber assembly is easily blackened), so that the user can realize that dust is reliably trapped and thus can get a higher level of satisfaction.

Further, in this invention, a distance between the two second fusion bonded parts between which the main cleaning part for trapping dust is provided is longer than a length of the unbonded portion in which the auxiliary cleaning part for trapping dust is provided. Therefore, the main cleaning part is the bulkiest in the fiber assembly and is formed in the middle of the cleaning element in a direction crossing the predetermined direction.

Typically, in cleaning operation, the cleaning element is used with its front end side lowered than its rear end side. Therefore, the construction in which the bulkiest main cleaning part of the fiber assembly is formed in the middle of the cleaning element like in this invention has an effect that the fiber assembly easily acts upon the face to be cleaned.

Further, in the cleaning element according to this invention, the two adjacent second fusion bonded parts provided in the middle of the cleaning element are arranged such that a distance between one of the second fusion bonded parts and one end of the cleaning element is equal to a distance between the other of the second fusion bonded parts and the other end of the cleaning element in a direction crossing the predetermined direction.

With this construction of the cleaning element, if the user turns around the cleaning element in use, the bulkiest main cleaning part of the fiber assembly is always located in the middle of the fiber assembly, so that the user can use the cleaning element without feeling odd, just like before the orientation change.

Further, in the cleaning element according to this invention, the first fusion bonded part is located such that fibers of the first fiber extending part have the same extending length, and the second fusion bonded parts are located such that fibers of the second fiber extending part have the same extending length.

Such construction of the cleaning element is effective in arranging and stabilizing the shape of the fiber assembly when air is contained in the fiber assembly.

Further, in the cleaning element according to this invention, the first fusion bonded part extends in a direction crossing the predetermined direction in the middle of the cleaning element in the predetermined direction. Further, the second fusion bonded parts are formed discontinuously in a direction crossing the predetermined direction on the both sides of the first fusion bonded part.

With this construction of the cleaning element, the fiber assembly can have a shape well-balanced between the right and left portions on the both sides of the first fusion bonded part when air is contained in the fiber assembly.

A cleaning tool according to this invention includes at least the above-described cleaning element and a cleaning element holder. The cleaning element holder in this invention has a grip to be held by a user in a cleaning operation and a holding portion for holding the cleaning element, and the grip and the holding portion are coupled to each other. The holding portion of the cleaning element holder is removably attached to the cleaning element. In the attached state of the cleaning element holder, the holding portion of the cleaning element holder holds the cleaning element. A user holds the grip of the cleaning element holder to perform a cleaning operation. Further, the user can replace the cleaning element by removing the cleaning element from the holding portion of the cleaning element holder as necessary.

With such construction, a cleaning tool with a cleaning element having a higher cleaning effect can be provided. Further, various constructions may be applied to attach the cleaning element holder to the cleaning element. Typically, it may be constructed such that a protruding cleaning element holding portion is inserted into the holding space of the cleaning element.

Further, the cleaning element attached to the holding portion of the cleaning element holder according to this invention may be of disposable type designed for single use, disposable type designed for multiple use which can be used several times, while retaining dust which has been removed from the face to be cleaned, on a brush portion, or reusable type which can be reused by washing.

As described above, according to this invention, in a sheet-type cleaning element for wiping an object to be cleaned, particularly, a cleaning effect can be enhanced by providing improved configurations of the fusion bonded parts for fusion bonding the fiber assembly and the nonwoven fabric which form the cleaning element.

Other objects, features and advantages of the present invention will be readily understood after reading the following detailed description together with the accompanying drawings and the claims.

DETAILED DESCRIPTION OF THE INVENTION

Each of the additional features and method steps disclosed above and below may be utilized separately or in conjunction with other features and method steps to provide and manufacture improved cleaning elements and cleaning tools and method for using such cleaning elements and cleaning tools, as well as devices utilized therein. Representative examples of the present invention, which examples utilized many of these additional features and method steps in conjunction, will now be described in detail with reference to the drawings. This detailed description is merely intended to teach a person skilled in the art further details for practicing preferred aspects of the present teachings and is not intended to limit the scope of the invention. Only the claims define the scope of the claimed invention. Therefore, combinations of features and steps disclosed within the following detailed description may not be necessary to practice the invention in the broadest sense, and are instead taught merely to particularly describe some representative examples of the invention, which detailed description will now be given with reference to the accompanying drawings.

A representative embodiment of the present invention will now be described with reference to the drawings. First, the structure of a cleaning tool 100 according to this embodiment will now be explained with reference to FIGS. 1 to 5.

Objects to be cleaned with the cleaning tool 100 includes faces to be cleaned (floors, walls, windows, ceilings, external walls, furniture, clothes, curtains, bedding, lighting, home electric appliances, etc.) inside and outside of houses, apartments, buildings, factories, vehicles, etc. and faces of human body parts to be cleaned. These faces to be cleaned may be either flat curved, uneven or stepped.

Figure 1:
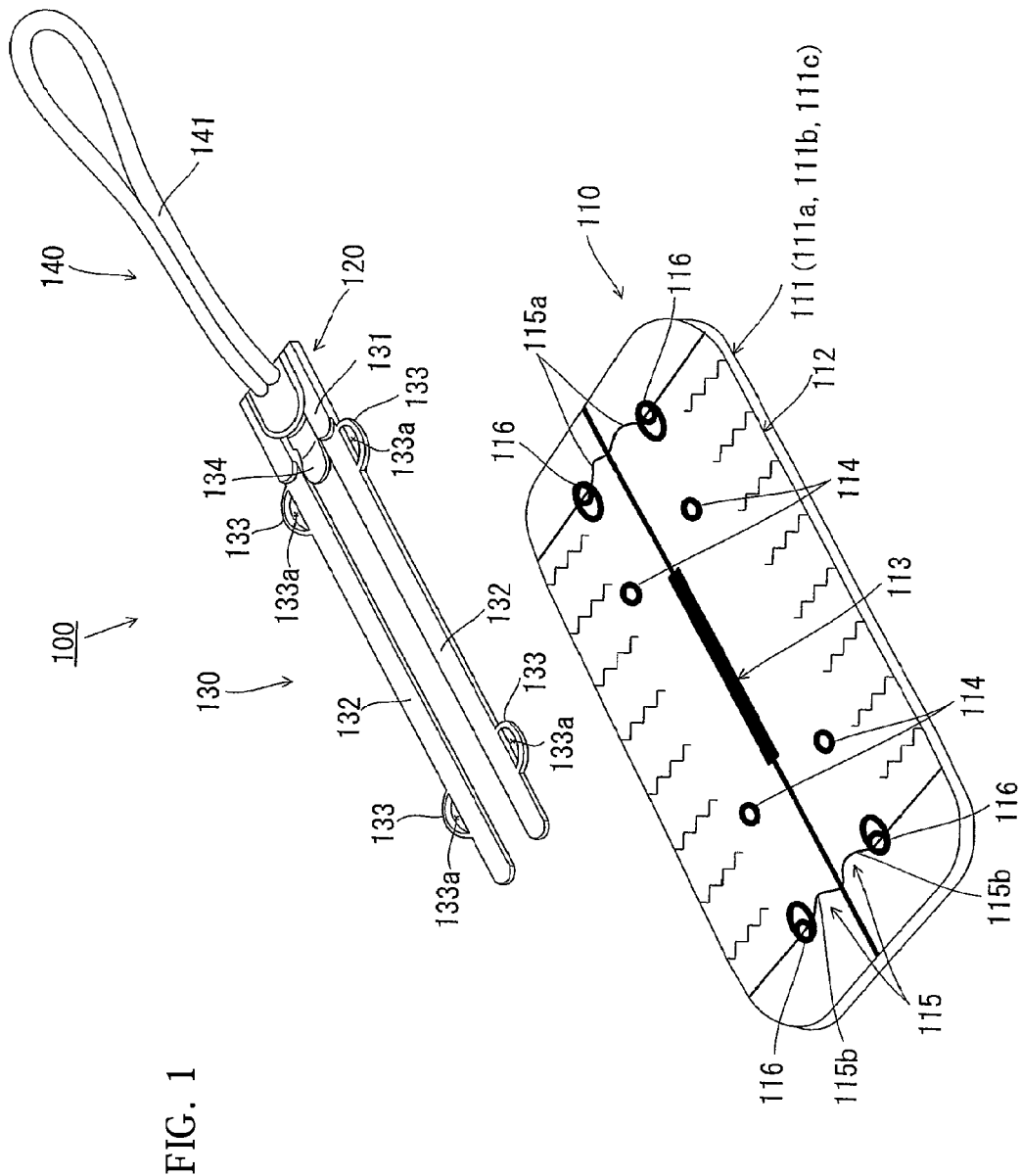
FIG. 1 is a perspective view showing a cleaning tool 100 according to an embodiment of the present invention, in a disassembled state into a cleaning element 110 and a cleaning element holder 120.

FIG. 1 shows the cleaning tool 100 according to this embodiment in perspective view, in a state disassembled into a cleaning element 110 and a cleaning element holder 120. As shown, the cleaning tool 100 comprises the cleaning element 110 and the cleaning element holder 120.

The cleaning element 110 includes a cleaning element body 111 and a holding sheet 112 disposed on and joined to the upper face of the cleaning element body 111. The cleaning element 110 comprises a sheet-type cleaning element having a function of removing dirt on the face to be cleaned. As shown in FIG. 1, the cleaning element 110 is rectangular in plan view and elongate in a predetermined longitudinal direction (the direction of the length). This predetermined longitudinal direction generally corresponds to the direction crossing the direction in which the plurality of fibers forming the fiber assembly extend. The cleaning element 110 may also be formed into a square shape in plan view as necessary.

The cleaning element body 111 forming the cleaning element 110 includes a base sheet 111a, a fiber assembly 111b and a cleaning side sheet 111c laminated and joined together, which will be described in more detail below. All of the base sheet 111a, the fiber assembly 111b and the cleaning side sheet 111c are of sheet type, similarly rectangular in plan view and elongate in the longitudinal direction of the cleaning element 110. The fiber assembly 111b and the cleaning side sheet 111c form a brush-like part having a dirt removing function, which is also referred to as the "brush portion". The cleaning element 110 may be of disposable type designed for single use, disposable type designed for multiple use which can be used several times, while retaining dust which has been removed from the face to be cleaned, on the brush portion, or reusable type which can be reused by washing. Further, in this embodiment, the cleaning element body 111 of the cleaning element 110 is described as a structure having the base sheet 111a, the fiber assembly 111b and the cleaning side sheet 111c stacked in layer, but may be constructed as a structure having an additional fiber layer and/or sheet.

The cleaning element body 111 and the holding sheet 112 are fusion bonded together at a central joining line 113 extending in the middle of the cleaning element 110 in its longitudinal direction and at fusion bonded parts 114, 116 disposed on the both sides of the central joining line 113.

The central joining line 113 is designed as a fusion bonded part at which the cleaning element body 111 and the holding sheet 112 are joined together. The central joining line 113 extends in the longitudinal direction through the middle of the cleaning element 110 and is a feature that corresponds to the "first fusion bonded part extending in a direction crossing the predetermined direction in order to fusion bond the fiber assembly and the nonwoven fabric" in this invention.

Further, the fusion bonded parts 114, 116 are designed as fusion bonded parts at which the base sheet 111a and part of the fiber assembly 111b of the cleaning element body 111 and the holding sheet 112 are joined together. The fusion bonded parts 114 correspond to the "plurality of second fusion bonded parts formed discontinuously in a direction crossing the predetermined direction in order to fusion bond the fiber assembly and the nonwoven fabric" in this invention.

Thus, a pair of right and left holding spaces 115 extending in the longitudinal direction are defined between the central joining line 113 and the fusion bonded parts 114, 116. Each of the holding spaces 115 has a rear open end 115a and a front open end 115b. A holding plate 132 of a holder body 130 which will be described below can be inserted into the holding space 115 from both the rear open end 115a and the front open end 115b.

As shown in FIG. 1, the cleaning element 110 having the above-described structure is removably attached to the cleaning element holder 120. The cleaning element holder 120 includes the holder body 130 and the handle 140 connected to each other. The handle 140 includes a longitudinally extending handle body 141 and a connection 141a disposed between the handle body 141 and the holder body 130. The handle body 141 is held by a user and is a feature that corresponds to the "grip" in this invention. The handle body 141 and the holder body 130 are fixedly connected at the connection 141a.

In this embodiment, the holder body 130 and the handle 140 (the handle body 141 and the connection 141a) are separately molded of resin material and thereafter assembled together. With this construction, the entire cleaning tool can be reduced in weight and the manufacturing costs can be reduced. Instead of this construction, the holder body 130 and the handle 140 (the handle body 141 and the connection 141a) may be integrally molded, or two of the holder body 130, the handle body 141 and the connection 141a may be integrally molded, or all of them may be separately molded and then fixedly assembled together.

The holder body 130 has a function of detachably holding the cleaning element 110 and is a feature that corresponds to the "cleaning element holding portion" in this invention. The holder body 130 includes a base 131 on the handle 140 side, a pair of holding plates 132 and a retaining plate 134. The holding plates 132 extend forward in the longitudinal direction from the base 131 and parallel with a predetermined spacing therebetween. In other words, the holder body 130 has a bifurcated form. Each of the holding plates 132 may have a constant width in the longitudinal direction or be tapered.

Further, two projections 133 are formed on the front and rear portions of the outer edge of each of the holding plates 132. Each of the projections 133 has an elliptic contour projecting outward from the holding plate 132 and has a convexly curved projecting surface. For example, the projection 133 has an elliptic contour having a 180° circular arc angle, a 16 mm major axis and a 8 mm minor axis. Further, an opening or hollow portion 133a is formed in the central portion of the projection 133. The retaining plate 134 extends forward between the pair holding plates 132 and is convexly curved downward. The retaining plate 134 further has an engagement lug (not shown) on the underside.

The holding plate 132 can be inserted into the associated holding space 115 and has a function of holding the cleaning element 110 in the inserted state. In the inserted state, the holding plate 132 is fitted in the associated holding space 115 by close sliding contact, so that the cleaning element 110 is securely attached to the holding plate 132. Further, in the inserted state, the retaining plate 134 presses the cleaning element 110 from above, and the engagement lug (not shown) formed on the underside of the retaining plate 134 serves as a stopper for preventing the cleaning element 110 from coming off. Thus, in the inserted state in which the holding plate 132 is inserted into the holding space 115, the cleaning element 110 is reliably retained by the holder body 130.

Figure 2:
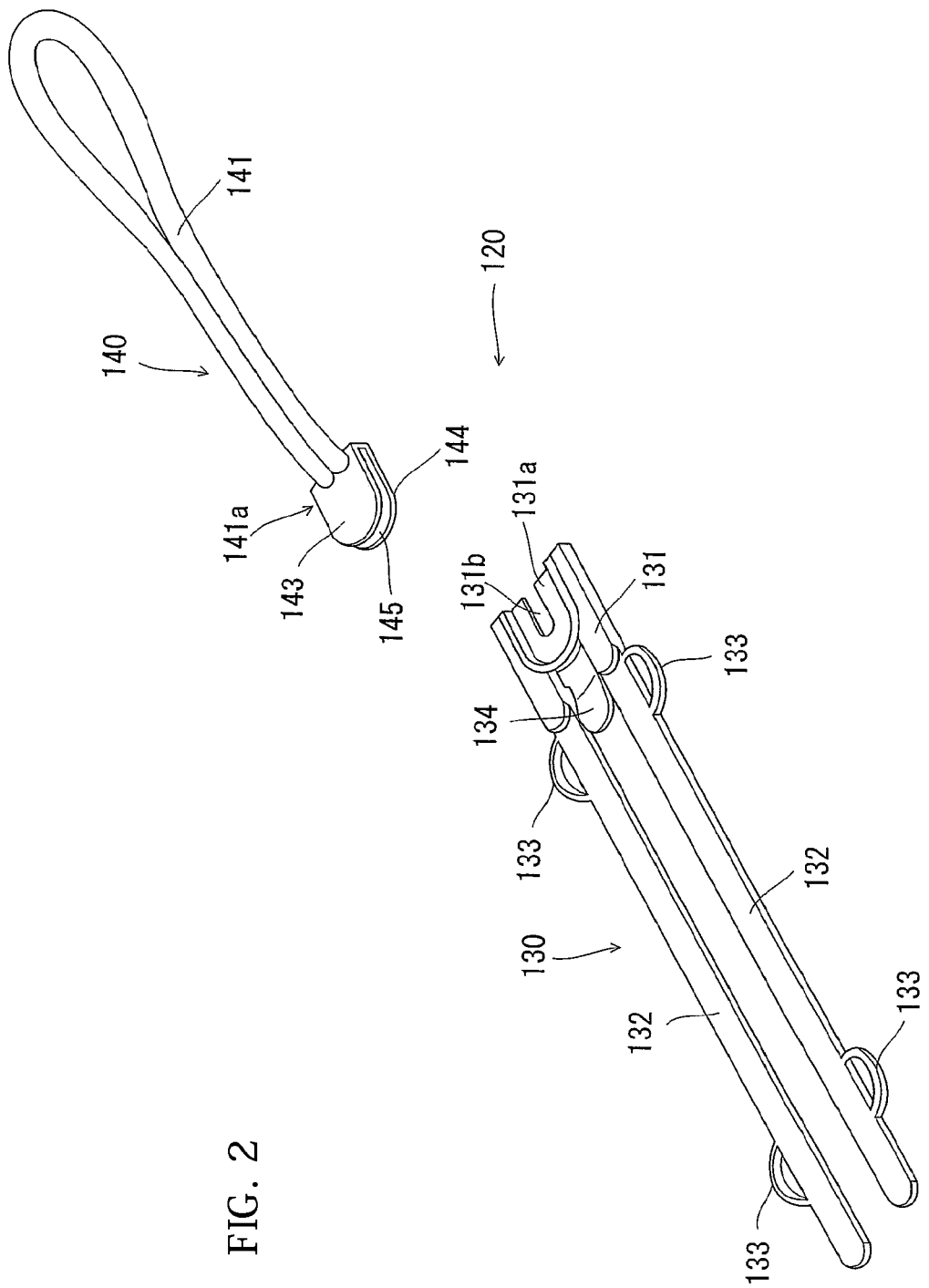
FIG. 2 is a perspective view of the cleaning element holder 120 of FIG. 1 in a disassembled state.

FIG. 2 is a perspective view of the cleaning element holder 120 of FIG. 1 in a disassembled state. As shown, the holder body 130 and the handle 140 are separately resin molded and thereafter disengageably connected together. The holder body 130 has an engagement plate 131a on the rear end of the base 131. The handle 140 has a first engaging plate 143 and a second engaging plate 144 on the front end of the handle body 141. An engagement region 145 is defined between the first engaging plate 143 and the second engaging plate 144 and can receive the engagement plate 131a. A projection (not shown) is provided in the engagement region 145 and can be engaged with a recess 131b of the engagement plate 131a. Thus, when the engagement plate 131a is inserted into the engagement region 145, the engagement plate 131a is sandwiched between the first engaging plate 143 and the second engaging plate 144. Further, the projection of the engagement region 145 is engaged with the recess 131b of the engagement plate 131a. Thus, the holder body 130 and the handle 140 are joined together by a joining force acting therebetween. In this state, the holder body 130 and the handle 140 can be disengaged from each other by pulling the holder body 130 and the handle 140 apart from each other by a pulling force larger than the joining force.

Figure 3:
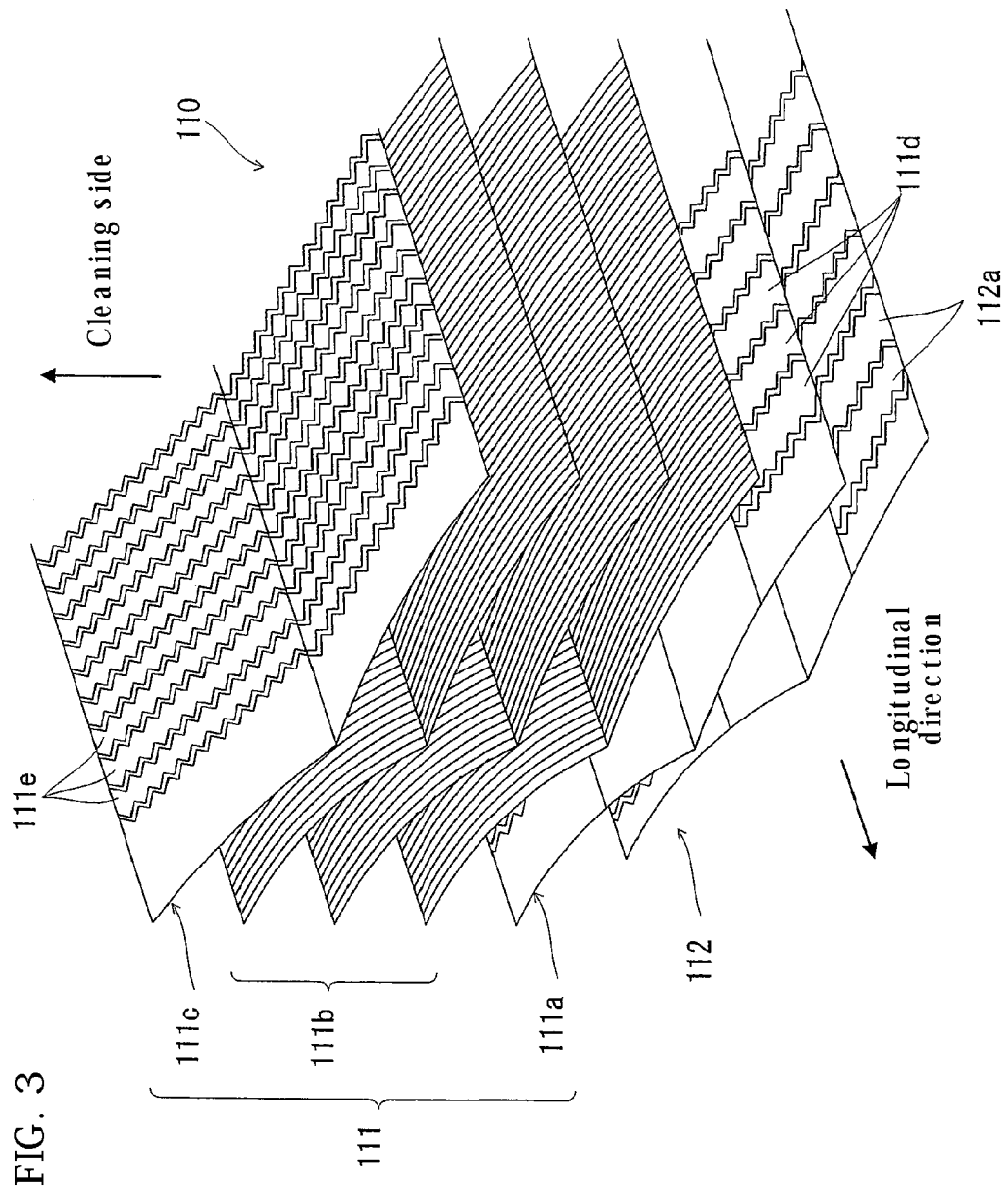
FIG. 3 is a perspective view of the cleaning element 110 of FIG. 1 which is shown separated into component elements.
Figure 4:
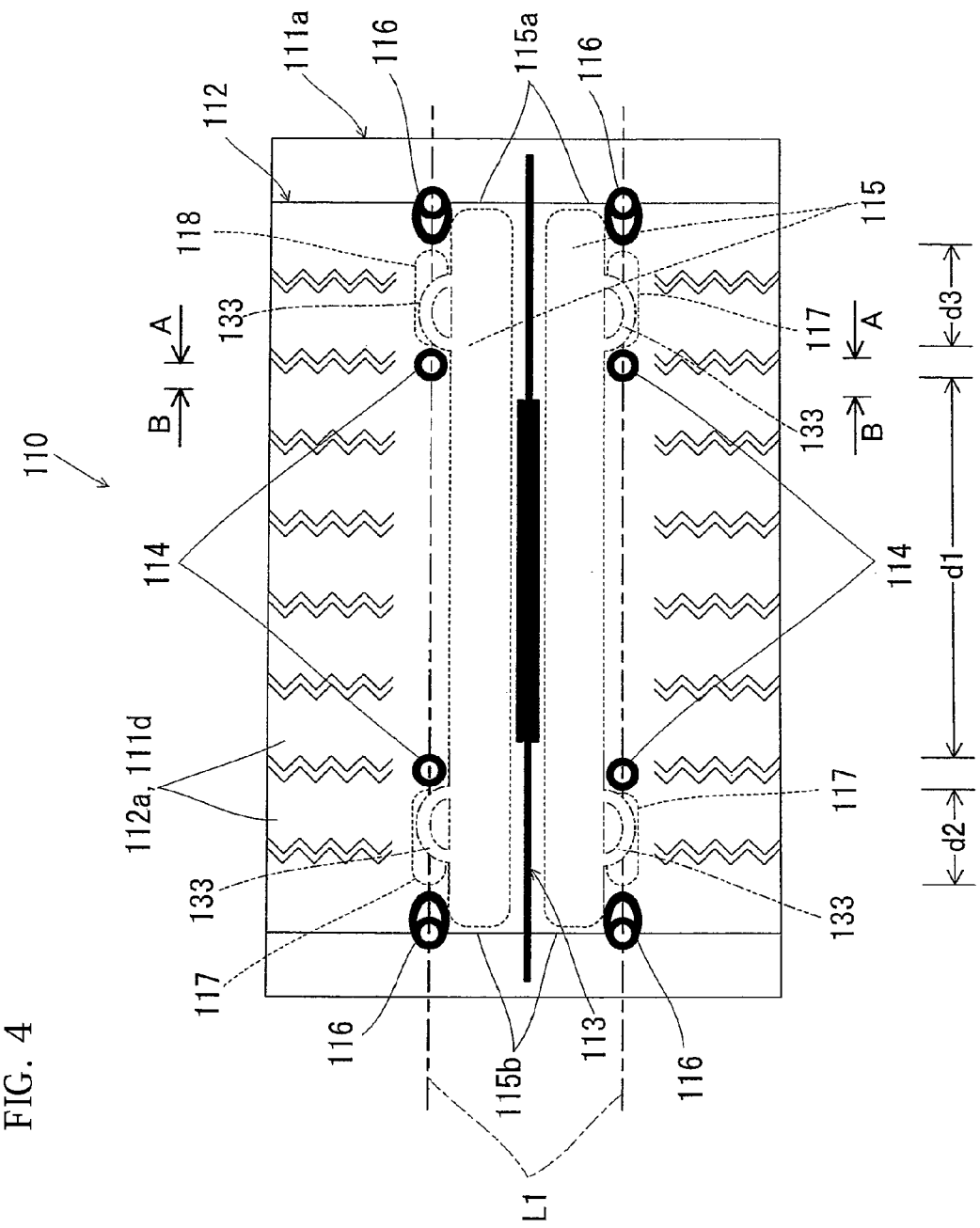
FIG. 4 is a plan view of the cleaning element 110 shown in FIG. 1, as viewed from the top.
Figure 5:
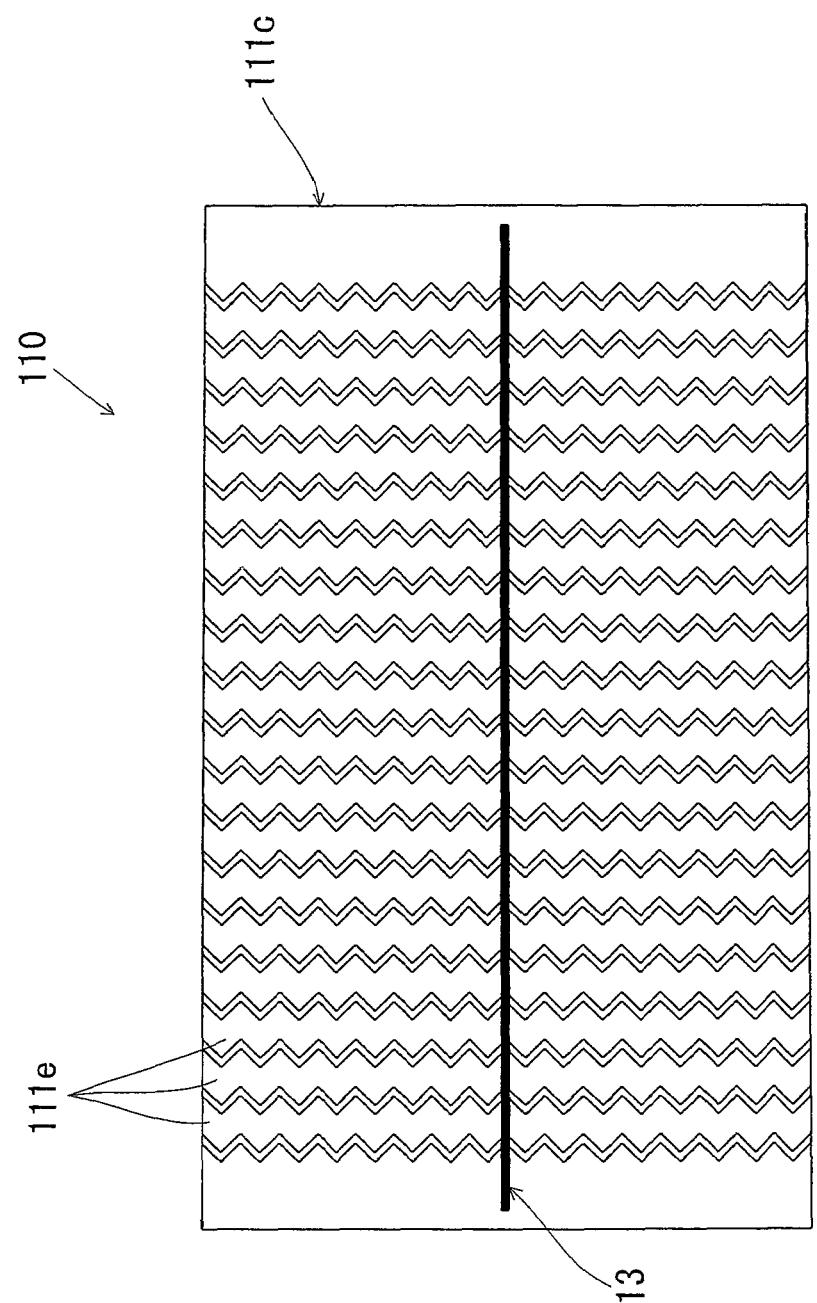
FIG. 5 is a plan view of the cleaning element 110 shown in FIG. 1, as viewed from the back.
Figure 6:
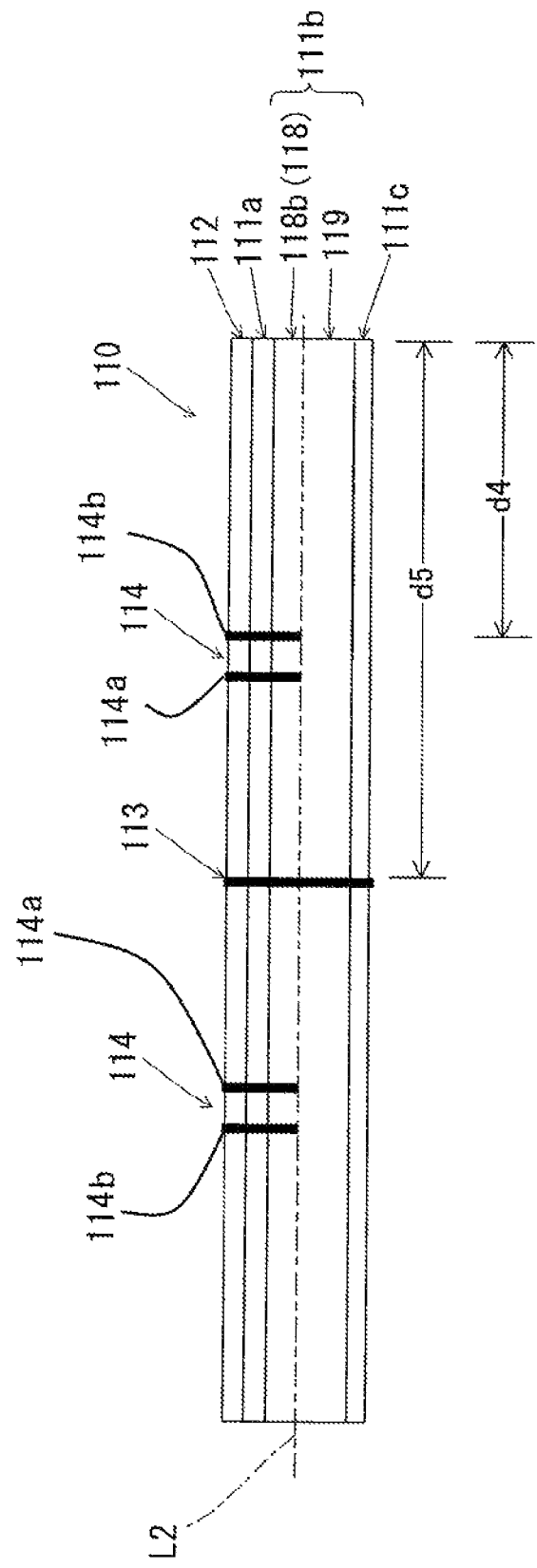
FIG. 6 is a sectional view of the cleaning element 110, taken along line A-A in FIG. 4.
Figure 7:
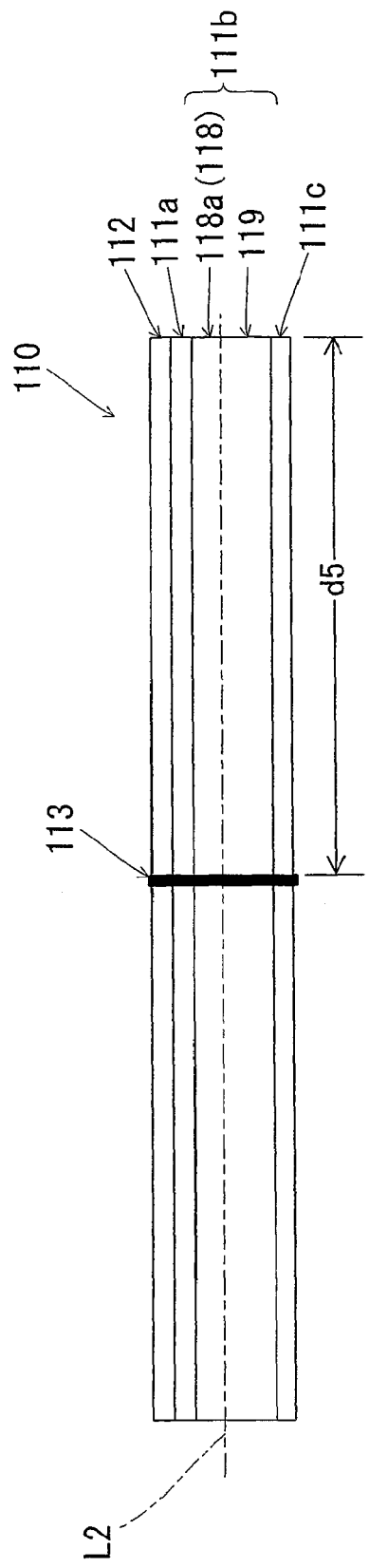
FIG. 7 is a sectional view of the cleaning element 110, taken along line B-B in FIG. 4.

Referring to FIGS. 3 to 7, the structure of the cleaning element 110 of this embodiment will be specifically described. FIG. 3 is a perspective view of the cleaning element 110 of FIG. 1 which is shown separated into component elements. FIG. 4 is a plan view of the cleaning element 110 shown in FIG. 1, as viewed from the top. FIG. 5 is a plan view of the cleaning element 110 shown in FIG. 1, as viewed from the back. FIG. 6 is a sectional view of the cleaning element 110, taken along line A-A in FIG. 4, and FIG. 7 is a sectional view of the cleaning element 110, taken along line B-B in FIG. 4.

As shown in FIG. 3, in the cleaning element 110 of this embodiment, the holding sheet 112 is overlaid on the cleaning element body 111 on the cleaning side (which is also referred to as the "lower face side" or the "back"). Further, the cleaning element body 111 has the cleaning side sheet 111c, the fiber assembly 111b and the base sheet 111a placed one on the other in this order from the cleaning side (lower face side). In this case, the holding sheet 112 and the base sheet 111a are overlaid on the upper face side of the fiber assembly 111b to form an upper face side sheet. Thus, the fiber assembly 111b is sandwiched between the holding sheet 112 and base sheet 111a (upper face side sheet) and the cleaning side sheet 111c (lower face side sheet). The holding sheet 112, the base sheet 111a and the cleaning side sheet 111c have a plurality of zigzag strips (strip portions) extending in a direction crossing the longitudinal direction of the cleaning element 110.

Specifically, the holding sheet 112 comprises a plurality of strips 112a arranged in parallel and extending in a direction crossing the longitudinal direction of the cleaning element 110. The base sheet 111a comprises a plurality of strips 111d arranged in parallel and extending in a direction crossing the longitudinal direction of the cleaning element 110. The cleaning side sheet 111c comprises a plurality of strips 111e arranged in parallel and extending in a direction crossing the longitudinal direction of the cleaning element 110. The zigzag strips of the sheets provides a structure to easily trap dust. The strips may have the same kind or different kinds of shape appropriately selected from various shapes, such as zigzag, linear and curved shapes.

As shown in FIG. 4, in the base sheet 111a, the strips 111d extend outward from the fusion bonded parts 114, 116 formed in the longitudinal direction of the cleaning element 110. Further, in the holding sheet 112 overlaid on the upper face of the base sheet 111a, the strips 112a having the same shape as the strips 111d extend outward from the fusion bonded parts 114, 116 formed in the longitudinal direction of the cleaning element 110.

Further, as shown in FIG. 5, in the cleaning side sheet 111c, the strips 111e having a smaller width than the strips 111d, 112a extend outward from the central joining line 113 extending along the longitudinal direction of the cleaning element 110. Therefore, the proximal ends of the strips 111e are joined at the central joining line 113. Each of the strips 111e extends elongate from one end fixed at the central joining line 113 to the other free end (distal end) on the side opposite to the fixed end.

The construction of the nonwoven fabric forming the above-described base sheet 111a, cleaning side sheet 111c and holding sheet 112 and the construction of the fiber assembly 111b will now be explained in detail.

The base sheet 111a, the cleaning side sheet 111c and the holding sheet 112 can typically be formed of sheet-type nonwoven fabric comprising thermal melting fibers (thermoplastic fibers) and thus referred to as nonwoven fabric sheet. The base sheet 111a and the holding sheet 112 herein form the "sheet-type nonwoven fabric" according to this invention. The nonwoven fabric has a sheet-like configuration formed by fixing or entangling fibers by mechanical, chemical or heat treatment.

The nonwoven fabric partly includes thermoplastic fibers and thus can be fusion bonded. Further, the nonwoven fabric has a plurality of strips. Examples of the thermal melting fibers (thermoplastic fibers) include polyethylene, polypropylene and polyethylene terephthalate. The nonwoven fabric may be manufactured by through-air bonding, spun bonding, thermal bonding, spun lacing, point bonding, melt blowing, stitch bonding, chemical bonding, needle punching or other similar processes. In order to enhance the dust wiping function, it is preferred to use a nonwoven fabric having higher rigidity. Further, as an alternative to or in addition to the nonwoven fabric, a material to be worked into strips, such as urethane, sponge, woven fabric, net and split cloth, may be used.

The fiber assembly 111b is a single fiber structure formed by fibers, a fiber structure having fibers aligned in the length direction and/or the radial direction (twist yarn, spun yarn, yarn to which a plurality of filaments are partially connected), or an assembly of the fiber structures. The fiber assembly 111b partially includes thermoplastic fibers and can be fusion bonded. The fibers forming the fiber assembly 111b are elements of yarn, textile or the like and defined as being thin and flexible fibers having a substantially longer length compared with the thickness. Typically, a long continuous fiber is defined as a filament and a short fiber as a staple.

The proximal ends of the fibers of the fiber assembly 111b are joined at the central joining line 113 and the fusion bonded parts 114, 116. The fibers of the fiber assembly 111b each have one end fixed at the fusion bonded parts and the other free end (distal end) on the opposite side. The fibers of the fiber assembly 111b extend elongate in a direction crossing the longitudinal direction of the cleaning element 110 (or the fiber assembly 111b). The fiber assembly 111b extending in a direction crossing the longitudinal direction of the cleaning element 110 is a feature that corresponds to the "fiber assembly comprising a plurality of fibers extending in the predetermined direction" according to this embodiment. The fiber assembly 111b is also referred to as the "fiber bundle" having a plurality of fibers in a bundle.

In the representative example shown in FIG. 3, the fiber assembly 111b comprises three fiber layers, but it may comprise one or more fiber layers as necessary. Preferably, the fiber assembly 111b has a planar structure having a predetermined flat or curved face and has a three-dimensional form having a certain thickness or has a thin sheet-like form. The "fiber assembly" is typically formed of polyethylene (PE), polypropylene (PP), polyethylene terephthalate (PET), nylon, rayon or the like. In practical use, an assembly of filaments formed by opening a tow is frequently used as the fiber assembly. It is particularly preferable that the fiber assembly comprises conjugated fibers having a core of polypropylene (PP) or polyethylene (PE) and a core covering sheath of polyethylene (PE). Further, the filaments of the fiber assembly are preferred to have a fineness of 1 to 50 dtex, more preferably 2 to 10 dtex. The individual fiber assembly may contain fibers of generally the same fineness or of different finenesses.

Further, in order to enhance the dust wiping function, it is preferred to use a fiber assembly including fibers having higher rigidity or fibers having higher fineness. It is further preferred that the fiber assembly has crimped fibers. Here, the crimped fibers are fibers subjected to a predetermined crimping process and easily entangled with each other. With the fibers being crimped, the fiber assembly becomes bulkier than before the holder is attached thereto, and dust can be easily captured by the crimped portions. This structure can be realized especially by using crimped fibers opened from a tow.

For the fiber assembly, flat yarns or split yarns may also be employed. The flat yarns are prepared by slitting a film into tapes and by stretching the tapes in the longitudinal direction. The split yarns are prepared by splitting a thermoplastic film resin in the direction perpendicular to the orientation direction of the resin so that the film is fibrillated and interconnected into a net shape. Alternatively, a nonwoven fabric which is bulky and has low fiber density, such as a through-air bonded nonwoven fabric, may be employed to form the fiber assembly.

The kinds and numbers of the component parts of the cleaning element 110 are not limited to those described in the above-described example, and can be selected as necessary. The cleaning element 110 is rectangular in plan view and is attached to the cleaning element holder 120 such that its longer side extends along the longitudinal direction of the holder body 130 and a handle 140 of the cleaning element holder 120.

The construction of the fusion bonded parts in the cleaning element 110 will now be explained in further detail with reference to FIGS. 4, 6 and 7. As shown in FIG. 4, a plurality of the fusion bonded parts 114, 116 (also referred to as "second fusion bonded parts") are formed on the both sides of the central joining line 113 (also referred to as "first fusion bonded part") at the same distance therefrom and arranged along the extending direction of the central joining line 113. Specifically, on each of extending lines L1 on the both sides of the central joining line 113, the fusion bonded parts 116 are formed at the rear open end 115a and the front open end 115b, and two fusion bonded parts 114 are formed between the two fusion bonded parts 116. In this embodiment, each of the fusion bonded parts 114 has a fusion bonded portion shaped into a circle (perfect circle), and each of the fusion bonded parts 116 has a fusion bonded portion shaped into a combined form obtained by superposing a circle (perfect circle) on an ellipse and elongated in the longitudinal direction. Further, as shown in FIG. 6, each of the fusion bonded parts 114 includes a first area 114a and a second area 114b, and a non-fusion bonded area provided between the first area 114a and the second area 114b. A length in the direction crossing the longitudinal direction from the central joining line 113 to the first area 114a is different from a length in the direction crossing the longitudinal direction from the central joining line 113 to the second area 114b. Further, a first space area is provided between the central joining line 113 and the first area 114a in the direction crossing the longitudinal direction. A second space area is provided between the first area 114a and the second area 114b in the predetermined direction. The nonwoven fabric has a strip forming area formed with the strips 112a and a strip non-forming area defined by the first space area and the second space area.

Each of the fusion bonded parts 114 is disposed opposite to the central joining line 113. A region demarcated by the fusion bonded parts 114 and the central joining line 113 forms the holding space 115 into which the holding plate 132 of the holder body 130 is inserted. The fusion bonded part 114 has at least a circular arc portion (curved portion) bulged toward the projection 133 of the inserted holding plate 132 which projects outward from the holding plate 132 of the holder body 130. With this construction, sliding resistance caused between the fusion bonded part 114 and the projection 133 when the holding plate 132 is inserted into the holding space 115 can be reduced. Thus, the holding plate 132 can be smoothly inserted into the holding space 115. Therefore, ease of attaching the holding plates 132 of the holder body 130 to the cleaning element 110 can be enhanced. The fusion bonded part 114 may have a curved surface shape comprising a circular arc portion of a circle or an ellipse in part or in entirety.

This effect of reducing the sliding resistance caused between the fusion bonded part 114 and the projection 133 can be further enhanced by providing the hollow portion 133a in the projection 133, in addition to the bulged shape of the fusion bonded part 114 and the projection 133. Specifically, when the projection 133 slides in contact with the fusion bonded part 114, the projection 133 easily deforms toward the holding plate 132 by the effect of the hollow portion 133a. Thus, the effect of reducing the sliding resistance caused between the fusion bonded part 114 and the projection 133 can be enhanced. In a construction in which this effect can be obtained only by deformation of the holding plate 132 itself or deformation of materials forming the cleaning element 110, the projection 133 may be solid.

Further, a region demarcated by the fusion bonded part 114 and the adjacent fusion bonded part 116 forms a housing region 117 for housing the projection 133 of the inserted holding plate 132. The fusion bonded part 114 interferes with the projection 133 housed in the housing region 117 and prevents the projection 133 from moving in the longitudinal direction of the cleaning element 110, so that the projection 133 is positioned in the holding space 115.

As to a specific configuration of the fusion bonded part 114 comprising a circular arc portion, the fusion bonded part 114 is preferably 7 to 12 mm in circular arc diameter and 90 to 360° in circular arc angle, and more preferably 10 mm in circular arc diameter and 180° in circular arc angle.

By forming the fusion bonded part 114 having the above-mentioned circular arc diameter, the projection 133 can smoothly climb over the fusion bonded part 114 when the holding plate 132 of the holder body 130 is inserted. Further, after insertion, the projection 133 once received in the housing region 117 does not easily come off. If the circular arc diameter of the fusion bonded part 114 is too small, the projection 133 will rapidly deform when it climbs over the fusion bonded part 114, so that smoothness cannot be obtained in the climbing movement. On the other hand, if the circular arc diameter is too large, the projection 133 once received in the housing region 117 will not be stabilized (not fit well) and easily come off the housing region 117.

Further, by forming the fusion bonded part 114 having the above-mentioned circular arc angle, the direction of insertion of the holding plate 132 of the holder body 130 can be stabilized. Further, the degree of difficulty in forming the fusion bonded part 114 by using a conventional thermal welding machine can be lowered, and the appearance of the fusion bonded parts can be improved. If the circular arc angle of the fusion bonded part 114 is too small, the fusion bonded part 114 will not be reliably engaged with the projection 133 and the direction of insertion of the holding plate 132 is not easily stabilized. Further, defective bonding is easily caused due to the smaller bonding area. Further, in terms of the appearance, in some cases, fusion bonded parts having a circular arc angle 180° or 360° is preferred in terms of the design.

As shown in FIG. 6, the central joining line 113 is designed to join the fiber assembly 111b in entirety in the direction of the thickness, while the fusion bonded parts 114 are designed to join the fiber assembly 111b only in part in the direction of the thickness. With this construction, the fiber assembly 111b is divided into upper fibers 118 and lower fibers 119 by a dividing line L2 in the direction of the thickness. The fusion bonded parts 114 may be designed to join the fiber assembly 111b in entirety in the direction of the thickness, as necessary.

Further, as shown in FIGS. 6 and 7, the upper fibers 118 have a first fiber extending part 118a and a second fiber extending part 118b. The proximal end of the first fiber extending part 118a is joined at the central joining line 113. The first fiber extending part 118a extends elongate from one end fixed at the central joining line 113 to the other free end (distal end) on the side opposite to the fixed end. Specifically, no fusion bonded part exists between the fixed end and the free end of the first fiber extending part 118a. Further, the second fiber extending part 118b extends elongate from one end fixed at the fusion bonded part 114 to the other free end (distal end) on the side opposite to the fixed end. Specifically, no fusion bonded part exists between the fixed end and the free end of the second fiber extending part 118b.

Further, in this embodiment, the central joining line 113 extends parallel to the long sides of the cleaning element through the middle of the cleaning element. Thus, the fibers of the first fiber extending part 118a have the same extending length. Further, the fusion bonded parts 114, 116 are formed on the both sides of the central joining line 113 at the same distance therefrom and arranged along the extending direction of the central joining line 113. Thus, the fibers of the second fiber extending part 118b have the same extending length. Such construction is effective in arranging and stabilizing the shape of the fiber assembly when air is contained in the fiber assembly. Particularly, the fiber assembly 111b can have a shape well-balanced between the right and left portions on the both sides of the central joining line 113. The bonded portion of the central joining line 113 may continuously linearly extend or discontinuously extend. Further, the bonded portions of the fusion bonded parts 114, 116 may extend along a predetermined line or along a predetermined curve.

The first fiber extending part 118a is a feature that corresponds to the "first fiber extending part having fibers which extend from one end fixed at the first fusion bonded part to the other free end on the end of the cleaning element in the predetermined direction" according to this invention. The second fiber extending part 118b is a feature that corresponds to the "second fiber extending part having fibers which extend from one end fixed at the second fusion bonded parts to the other free end on the end of the cleaning element in the predetermined direction" according to this invention.

The proximal ends of the lower fibers 119 are joined at the central joining line 113, and each of the lower fibers 119 extends elongate from one end fixed at the central joining line 113 to the other free end (distal end) on the side opposite to the fixed end. Specifically, no fusion bonded part exists between the fixed ends and the free ends of the lower fibers 119. Therefore, an extending length d5 of the first fiber extending part 118a of the upper fibers 118 and the extending length d5 of the lower fibers 119 are longer than an extending length d4 of the second extending part 118b.

With this construction of the cleaning element 110 of this embodiment, fibers joined to the base sheet 111a and the holding sheet 112 at the central joining line 113 and the fusion bonded part 114 form a horizontal section having a relatively high bond strength between the central joining line 113 and the fusion bonded parts 114. This construction is effective in obtaining a high bond strength which cannot be obtained by joining only the base sheet 111a and the holding sheet 112. Further, with this construction in which the horizontal section is formed between the central joining line 113 and the fusion bonded parts 114, the cleaning element 110 can easily conform to a horizontal face to be cleaned, during cleaning operation. Thus, this construction is effective in enhancing the cleaning effect.

Further, when the cleaning element 110 is lightly shaken or broken up into pieces directly by user's hand such that air is taken into the fiber assembly 111b, fibers of the first fiber extending part 118a which have a relatively long length in the fiber assembly 111b are easily entangled with each other and depend downward. On the other hand, fibers of the second fiber extending part 118b which have a relatively short length in the fiber assembly 111b are not easily entangled with the first fiber extending part 118a. Therefore, when air is taken into the fiber assembly 111b, the fiber assembly 111b is held homogeneous with a limited amount of unnecessary voids, and the fiber assembly 111b is wholly densely spread. Thus the volume of the fiber assembly 111b is increased.

This state in which the fibers have a high density and are homogeneous can be defined as providing a high voluminous feeling, and also referred to as a "bulky state", "volume increased state", "high space-fullness state" or "bulk-up state". Therefore, the cleaning effect can be enhanced by increasing the volume of the fiber assembly 111b. Further, due to the volume increase, the fiber assembly 111b makes closer contact with a face to be cleaned. Therefore, dirt of the fiber assembly 111b stands out (the fiber assembly 111b is easily blackened), so that the user can get a higher level of satisfaction, realizing that dust is reliably trapped.

Particularly, in this embodiment, a distance d2 between the adjacent fusion bonded parts 114 disposed in the middle of the cleaning element in the longitudinal direction is longer than a distance d2 between the front fusion bonded parts 114 and 116 and a distance d3 between the rear fusion bonded parts 114 and 116. Fibers of the unbonded portion between the fusion bonded parts 114 serve as a main cleaning part (a main cleaning part 111f which is shown in FIG. 10 and will be described below) for trapping dust.

Figure 10:
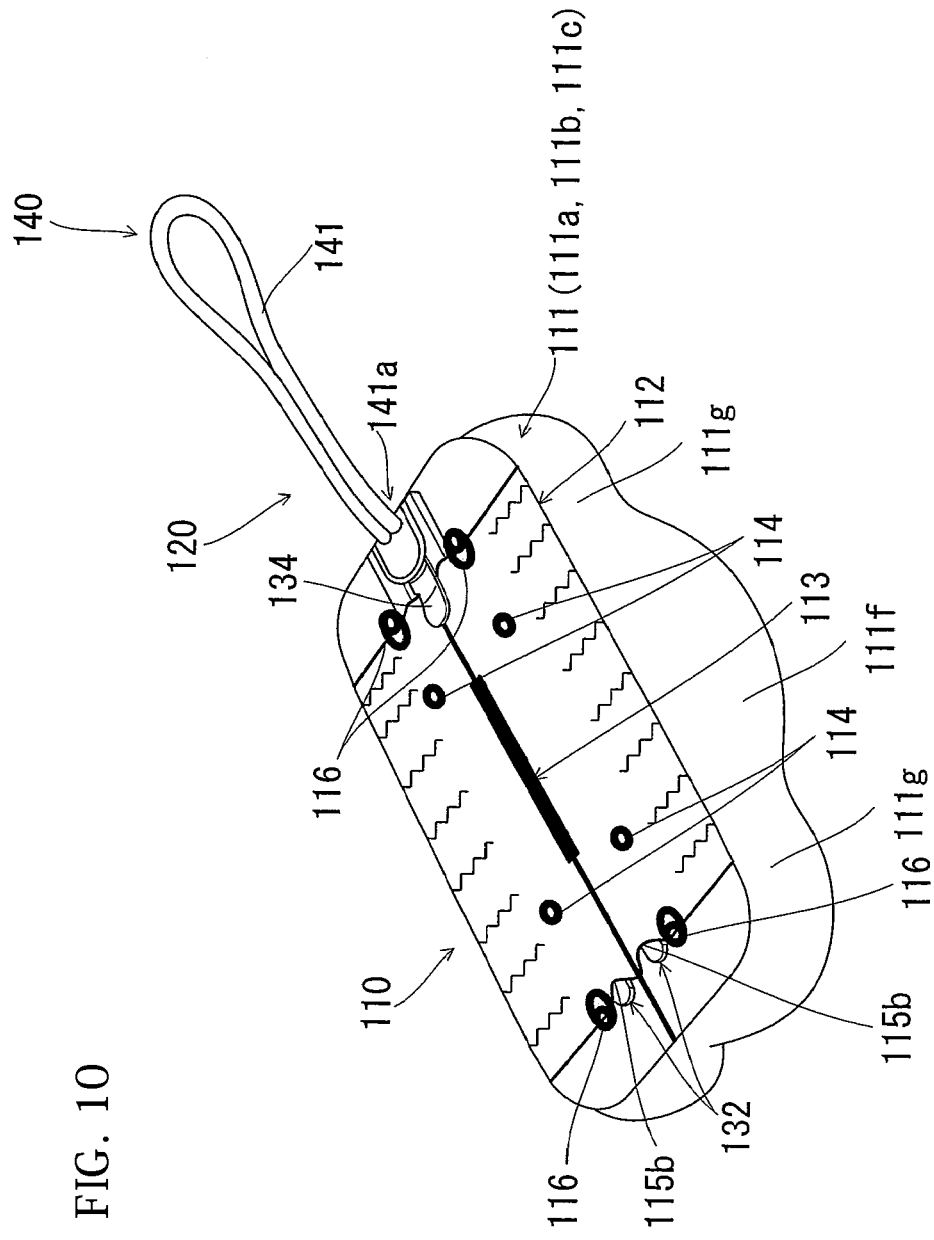
FIG. 10 is a perspective view showing the cleaning element 110 shown in FIG. 9 and broken up into pieces.

Fibers of the unbonded portion between the fusion bonded part 114 and the fusion bonded part 116, and fibers of the unbonded portion between the fusion bonded part 116 and the cleaning element end serve as an auxiliary cleaning part (an auxiliary cleaning part 111g which is shown in FIG. 10 and will be described below) for trapping dust. Therefore, according to this embodiment, the main cleaning part is the bulkiest in the fiber assembly 111b and is formed in the middle of the cleaning element between the two fusion bonded parts 114 in the longitudinal direction. Typically, in cleaning operation, the cleaning element 110 is used with its front end side lowered than its rear end side. Therefore, the construction in which the bulkiest main cleaning part of the fiber assembly 111b is formed in the middle of the cleaning element like in this embodiment has an effect that the fiber assembly 111b easily acts upon the face to be cleaned.

Further, in this embodiment, preferably, the distance between the front fusion bonded part 114 and the front end of the cleaning element 110 is equal to the distance between the rear fusion bonded part 114 and the rear end of the cleaning element 110. With this construction, whether the holding plate 132 of the holder body 140 is inserted from the rear open end 115a or the front open end 115b, the bulkiest main cleaning part of the fiber assembly 111b is always located in a predetermined middle position of the fiber assembly 111b. Therefore, if the user turns around the cleaning element 110 in use, the user can use the cleaning element 110 without strange feeling, just like before the change of orientation of the cleaning element 110.

The fusion bonded parts 116 are formed at the rear open end 115a and the front open end 115b and provide a function of guiding the holding plate 132 of the holder body 130 to be smoothly inserted into the holding space 115. Therefore, the fusion bonded parts 116 extend in the longitudinal direction and preferably includes a linear portion extending linearly in the longitudinal direction toward the holding space 115. In this manner, when the holding plate 132 of the holder body 130 is inserted into the holding space 115, the holding plate 132 can be more smoothly guided into the holding space 115.

As to a specific configuration of the fusion bonded part 116, the fusion bonded part 116 is preferably 10 to 17 mm or more preferably 15 mm, in extending length in the longitudinal direction. By forming the fusion bonded part 116 having such an extending length, the operation of inserting the holding plate 132 of the holder body 130 can be stabilized. Further, the area of insertion of the holding plate 132 can be easily recognized, and the degree of difficulty in forming the fusion bonded part 116 by using a conventional thermal welding machine can be lowered. If the extending length of the fusion bonded part 116 is too short, the operation of inserting the holding plate 132 cannot be stabilized and the area of insertion of the holding plate 132 cannot be easily recognized. Further, if the fusion bonded part 116 is formed at a position displaced from a specified joining position, the fiber assembly 11b, the base sheet 111a and the holding sheet 112 cannot be reliably joined together.

Figure 8:
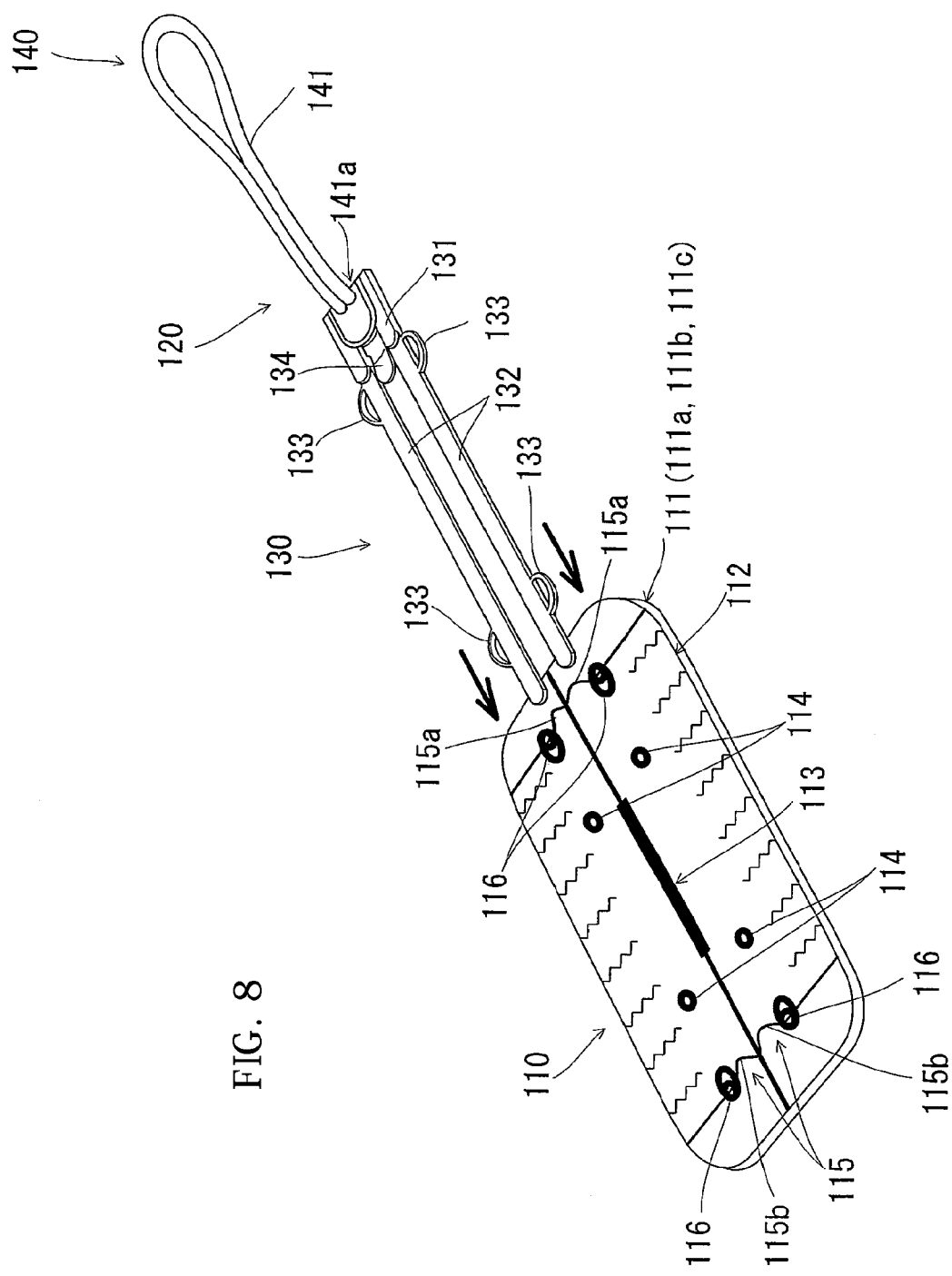
FIG. 8 is a perspective view showing the manner of attaching the cleaning element 110 to the cleaning element holder 120 in this embodiment.
Figure 9:
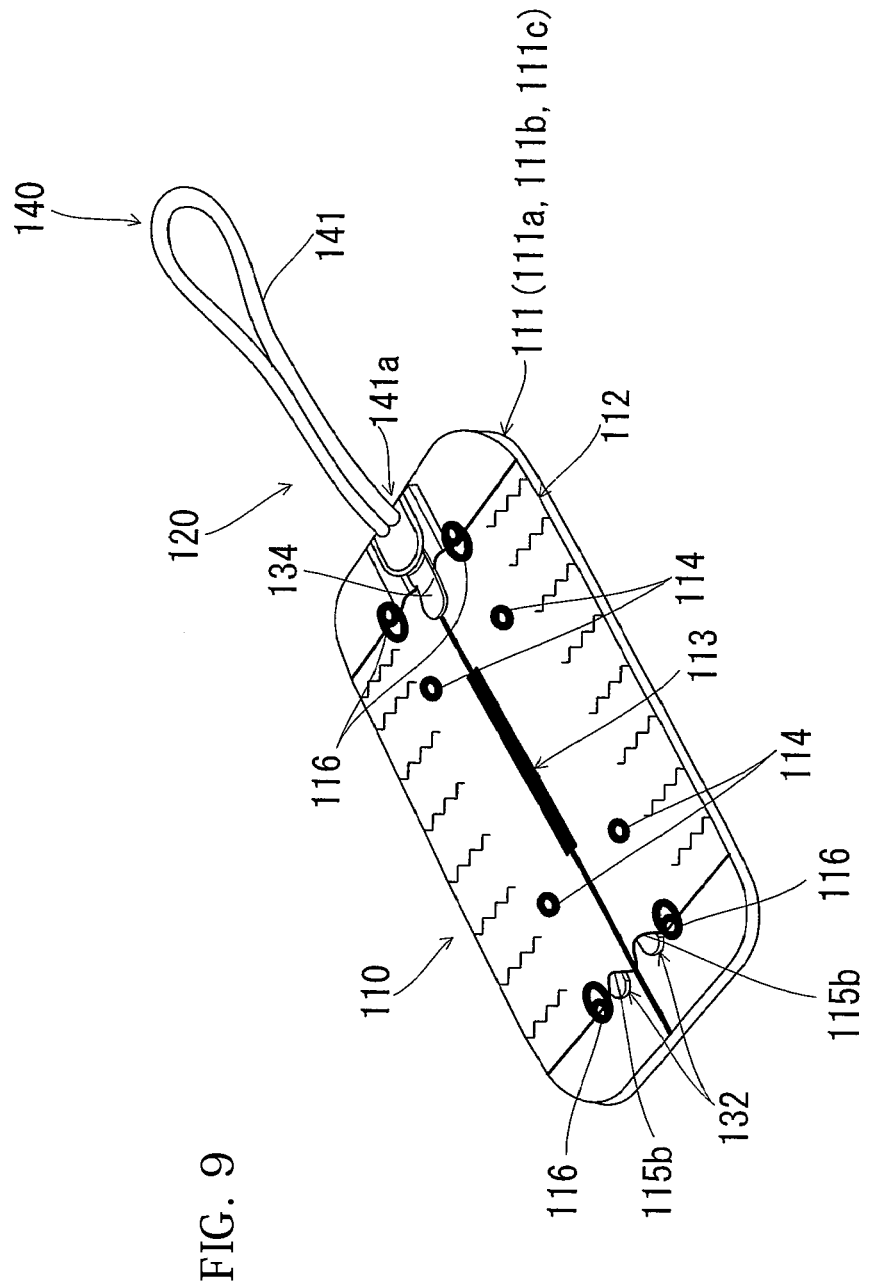
FIG. 9 is a perspective view showing the manner of attaching the cleaning element 110 to the cleaning element holder 120 in this embodiment.

Usage of the cleaning tool 100 having the above-described construction will now be described with reference to FIGS. 8 to 10. FIGS. 8 and 9 are perspective views showing the manner of attaching the cleaning element 110 to the cleaning element holder 120 in this embodiment. FIG. 10 is a perspective view showing the cleaning element 110 shown in FIG. 9 and broken up into pieces.

In order to use the cleaning tool 100, as shown in FIG. 8, the holding plates 132 of the holder body 130 are inserted from the rear open end 115a of the holding space 115, so that the cleaning element 110 is attached to the cleaning element holder 120. With the construction of this embodiment in which the holding space 115 has the rear open end 115a and the front open end 115b, the holding plate 132 of the holder body 130 can be inserted from the front open end 115b of the holding space 115, as necessary, so that the cleaning element 110 can also be attached to the cleaning element holder 120 in the inverted position.

In order to attach the cleaning element 110 to the cleaning element holder 120, first, the front ends of the holding plates 132 are inserted into the holding space 115. At this time, the front projection 133 of each of the holding plates 132 is engaged with the inner edge portion of the fusion bonded part 116. Thus, the holding plate 132 is positioned with respect to the holding space 115. In this embodiment, the fusion bonded part 116 has components extending in the longitudinal direction. Therefore, the direction of movement of the holding plate 132 can be naturally fixed on a line even if the user does not care about it, and the holding plate 132 can be smoothly guided forward in the holding space 115.

Further, when the holding plate 132 is inserted into the holding space 115, the front projection 133 climbs over the circular arc portion of the rear fusion bonded part 114 and then over the circular arc portion of the front fusion bonded part 114. At this time, each time the front projection 133 climbs over the circular arc portions of the fusion bonded parts 114, the holding plate 132 and the projection 133 itself repeat inward deformation and reversion (recovery). Thus, the resistance acted upon the user continuously changes. The user feels such change of the resistance as movement of the holding plates 132 which moves toward and away from each other. Therefore, it is effective in providing the user with peace of mind that the cleaning element holder 120 is reliably attached to the cleaning element 110 and seems not to easily come off.

When the front and rear projections 133 are received in the respective housing regions 117, the base 131 of the holder body 130 interferes with the rear open end 115a, so that the holder body 130 is prevented from further moving forward. In this state, the cleaning element holder 120 is attached to the cleaning element 110. In this attached state, the fusion bonded parts 114, 116 on the both sides of the projections 133 prevent the projections 133 from moving. Thus, the cleaning element 110 is prevented from coming off the cleaning element holder 120 just by lightly shaking the cleaning element holder 120.

In this manner, the cleaning tool 100 is provided in the state shown in FIG. 9. In this state, the thickness of the cleaning element 110 is kept to a minimum. Further, the cleaning side sheet 111c facing the face to be cleaned is held separated from the fiber assembly 111b, so that it cannot perform a desired cleaning function. In order to obtain a desired cleaning function, preferably, the cleaning element 110 is lightly shaken or broken up into pieces directly by hand, or lightly shaken with the cleaning element holder 120 held by hand, such that air is taken into the fiber assembly 111b and the fiber assembly 111b expands three-dimensionally.

By such breaking-up or shaking of the cleaning element 110, the fibers of the fiber assembly 111b are mixed with the strips 111e of the cleaning side sheet 111c. Upon swinging movement of the strips 111e about the fixed ends or the central fusion-bonding line 113, the outer free ends of the strips 111e depend downward under the own weight. At this time, the fibers of the fiber assembly 111b depend downward around the bonded portion of the central fusion-bonding line 113 together with the strips 111e of the cleaning side sheet 111c. Thus, containing air in the fiber bundle 111b, the cleaning element 110 is made bulkier than before the cleaning element holder 120 is attached. Specifically, in synchronization with the swinging movement of the strips 111e of the cleaning side sheet 111c, the cleaning element 110 expands by containing air between the fibers of the fiber assembly 111b.

Particularly, in this embodiment, the strips 111e of the cleaning side sheet 111c have a relatively smaller width than the strips 111d of the base sheet 111a. Therefore, the volume of the fiber assembly 111b can be increased without causing a problem that the strips 111e impair elasticity of the fiber assembly 111b. Thus, the users can gain higher expectations and peace of mind with respect to the dust trapping function. Further, by forming the fiber assembly 111b by using crimped fibers as mentioned above, the fibers of the fiber assembly 111b can be easily entangled with the strips 111e of the cleaning side sheet 111c.

Thus, as shown in FIG. 10, the fibers of the fiber assembly 111b are mixed with the strips 111e of the cleaning side sheet 111c and the main cleaning part 111f of the fiber assembly 111b is increased in volume, so that the fiber assembly 111b expands three-dimensionally. By expansion of the main cleaning part 111f formed between the front and rear auxiliary cleaning parts 111g in the cleaning element 110, the main cleaning part 111f can more easily conform to (or make close contact with) irregular or curved surfaces of the object to be cleaned. At this time, the fibers of the fiber assembly 111b which are mixed with the strips 111e of the cleaning side sheet 111c perform a cleaning function in cooperation with the strips 111e.

Particularly, the fiber assembly 111b serves as a core of a dirt collecting function as dirt is entangled between the fibers of the fiber assembly 111b or on the crimped portions of the fibers. Further, the fiber assembly 111b is exposed downward from the strips 111e and thus appears to be increased in volume, which can provide the users with higher expectations and peace of mind with respect to the dust trapping function. The strips 111e have a dirt collecting function as a supplement to the fiber assembly 111b serving as a core of the dirt collecting function. The strips 111e can easily reach into finer irregularities or curved surfaces of the object to be cleaned and retain the dust between the strips or on the strip faces, thus performing a cleaning function. The strips 111d of the base sheet 111a and the strips 112a of the holding sheet 112 are not easily affected by the movement of the fiber assembly 111b and perform a dust wiping-out function independently of the movement of the fiber assembly 111b.

The present invention is not limited to the embodiment as described above, but rather, may be added to, changed, replaced with alternatives or otherwise modified. For example, the following provisions can be made in application of this embodiment.

In the above-described embodiment, the distance between the front fusion bonded part 114 and the front end of the cleaning element 110 is described as being equal to the distance between the rear fusion bonded part 114 and the rear end of the cleaning element 110. However, in this invention, the distance between the front fusion bonded part 114 and the front end of the cleaning element 110 may be different from the distance between the rear fusion bonded part 114 and the rear end of the cleaning element 110.

Further, although, in this embodiment, the fusion bonded parts 114, 116 of the cleaning element 110 are described as being formed on the both sides of the central joining line 113, the fusion bonded parts 114, 116 may be formed on either one side of the central joining line 113.

Further, although, in this embodiment, the fusion bonded parts 114 are described as having a circular shape as shown in FIG. 4, it is essential for the fusion bonded parts to have at least a bulged portion protruding toward the central joining line 113. The shape and the number of the fusion bonded parts can be changed as necessary. For example, the fusion bonded parts may be shaped as shown in FIGS. 11 to 16. Cleaning elements 210, 220, 230, 240 250, 260 shown in FIGS. 11 to 16 have substantially the same construction as the cleaning element 110 except for the shape or the number of the first fusion bonded parts.

Figure 11:
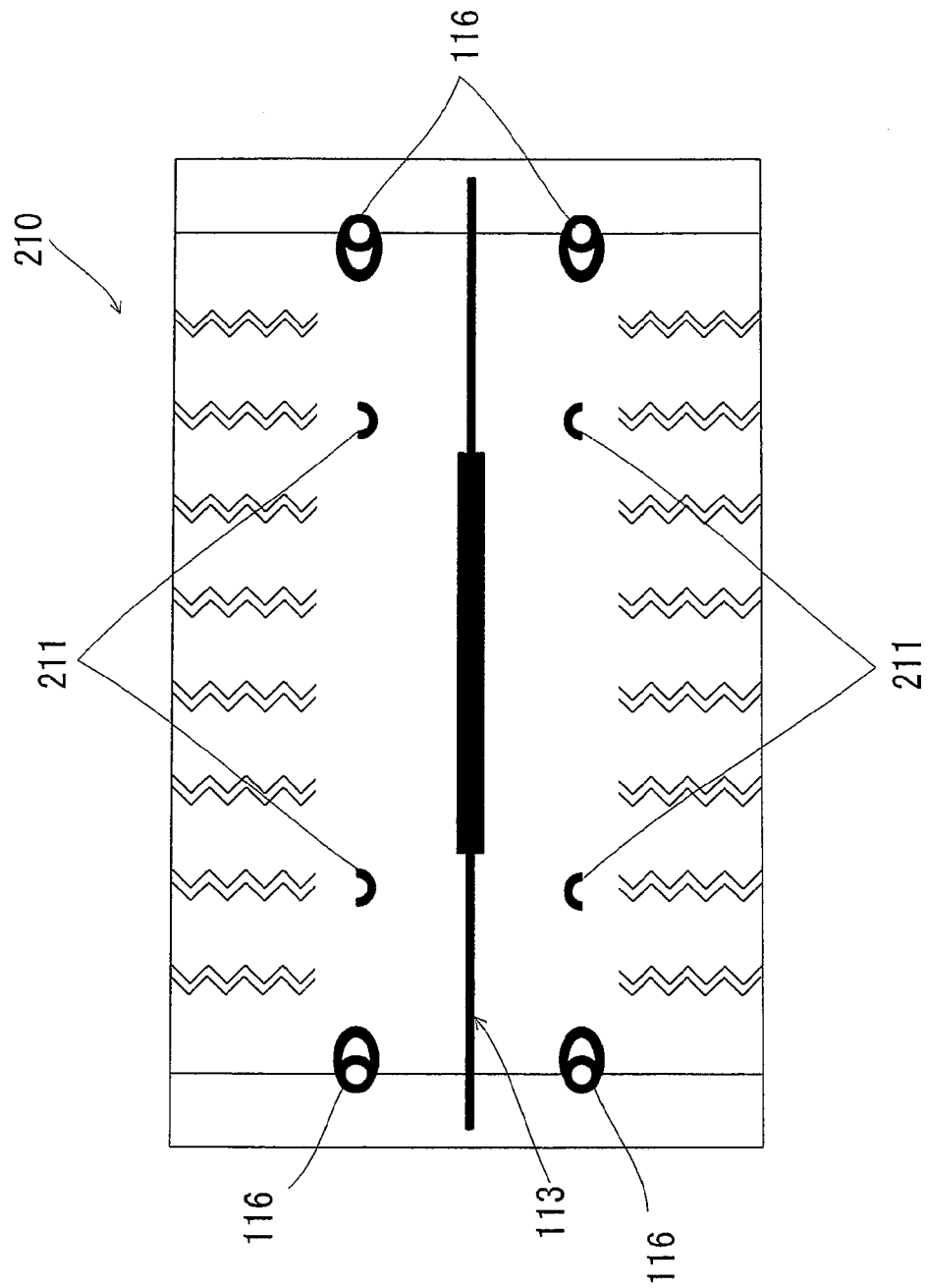
FIG. 11 is a plan view showing a cleaning element 210 according to another embodiment.
Figure 12:
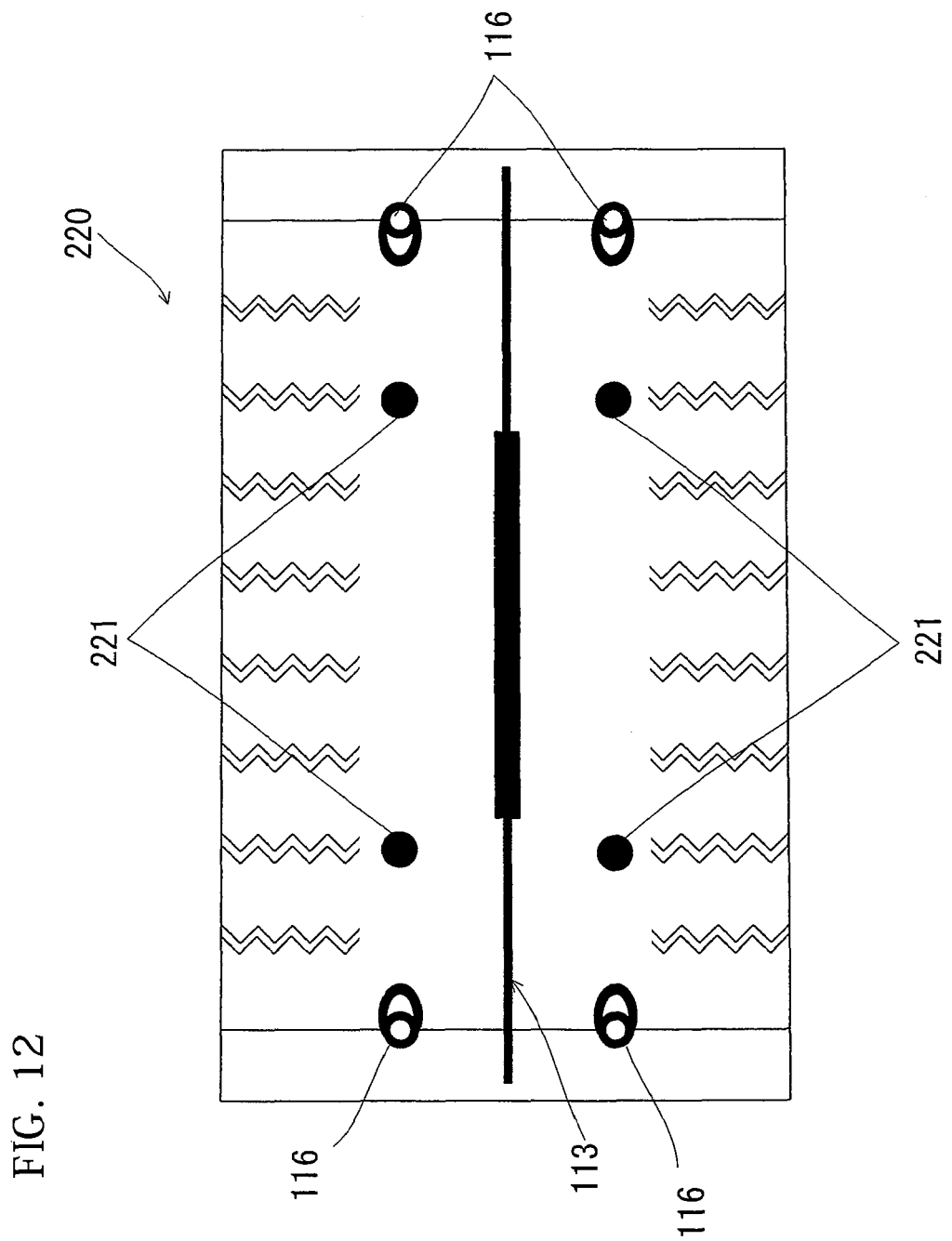
FIG. 12 is a plan view showing a cleaning element 220 according to a different embodiment.

The cleaning element 210 shown in FIG. 11 has first fusion bonded parts 211 having a circular angle of 180°. The cleaning element 220 shown in FIG. 12 has first fusion bonded parts 221 having a solid filled circular shape (joined over the whole circular area). With the first fusion bonded parts 221 having such a shape, the joint area is increased, so that the bond strength is increased. Further, a powerful appearance can be obtained, and the position of the holding space can be easily recognized by the user.

Figure 13:
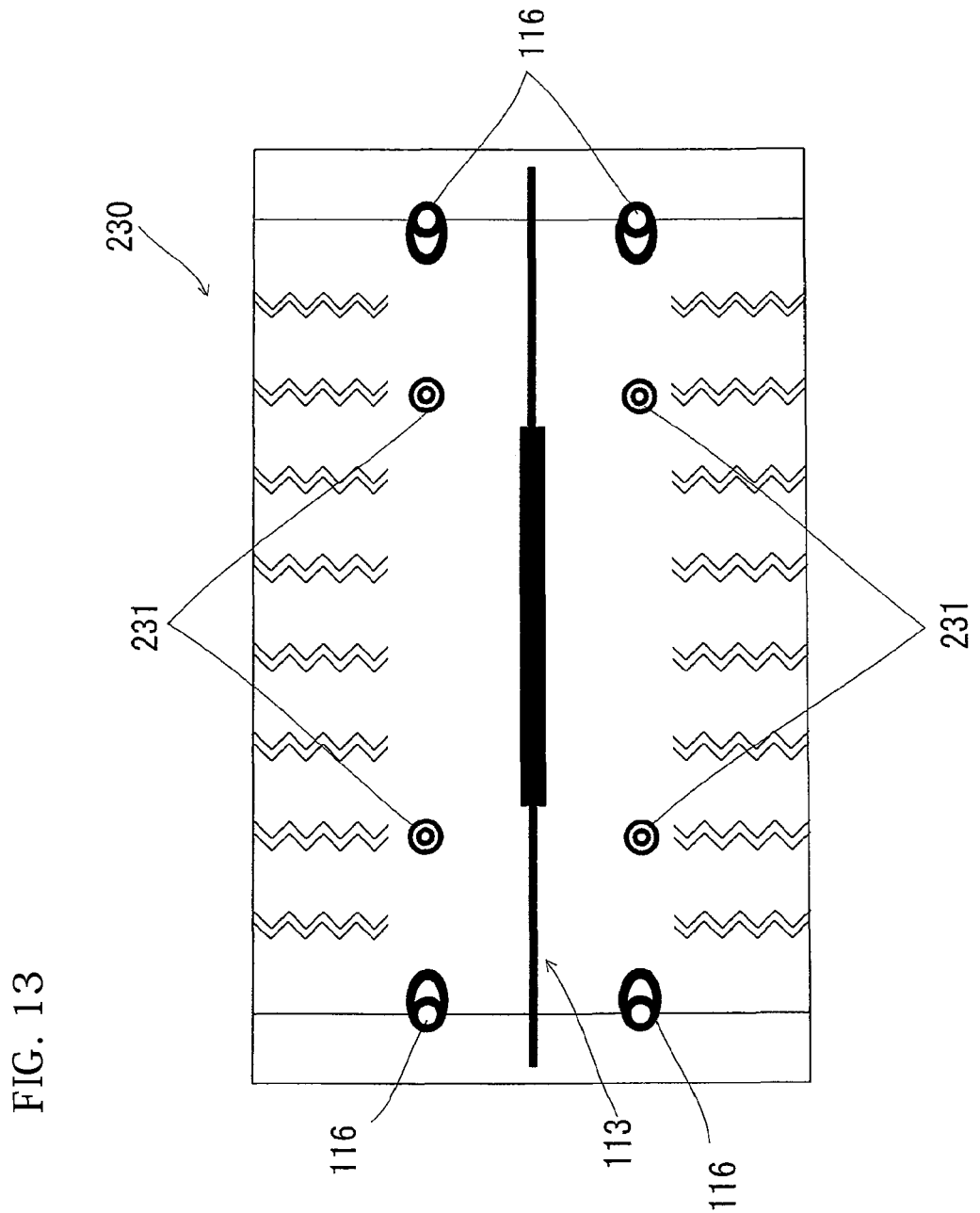
FIG. 13 is a plan view showing a cleaning element 230 according to a different embodiment.
Figure 14:
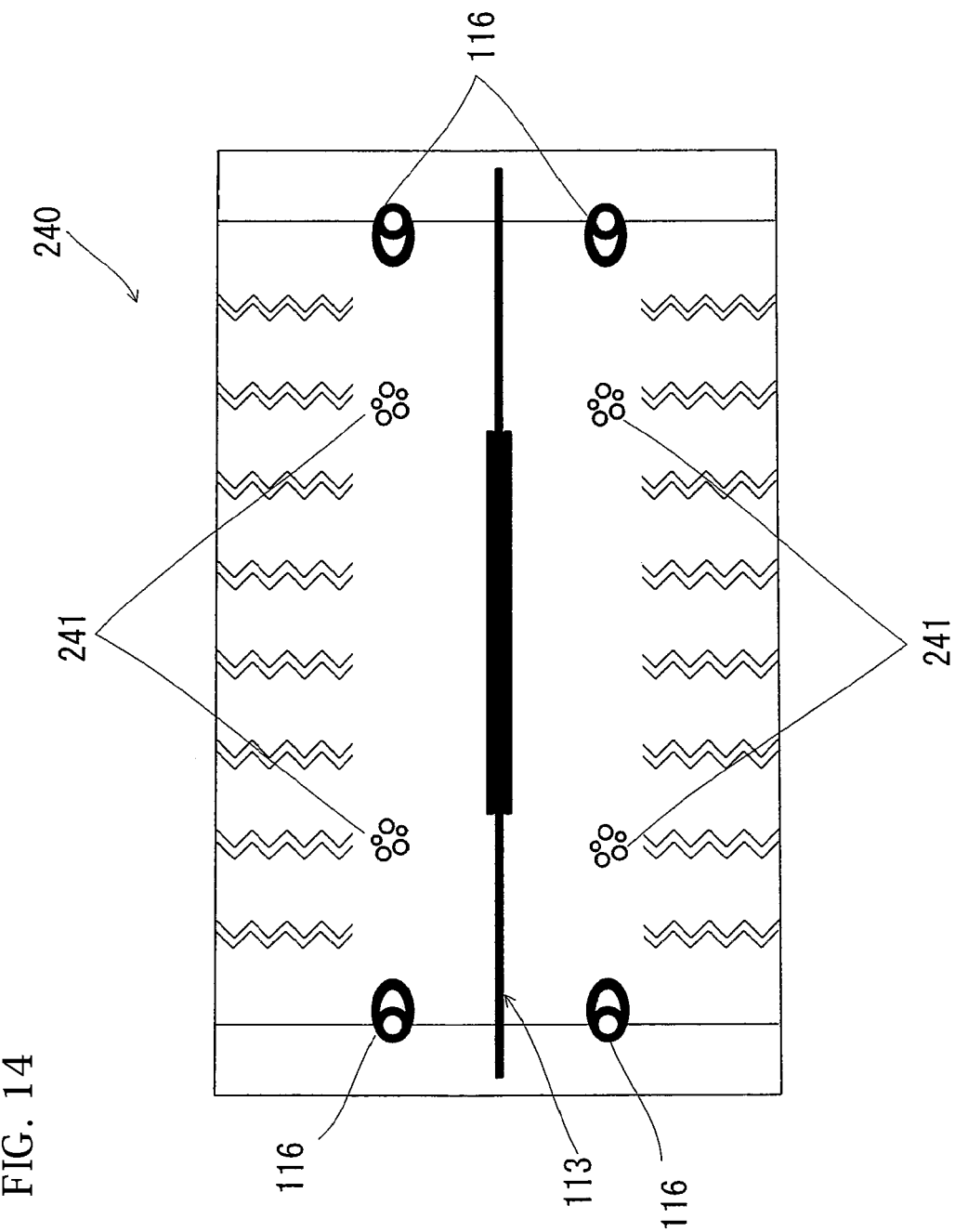
FIG. 14 is a plan view showing a cleaning element 240 according to a different embodiment.

Further, the cleaning element 230 shown in FIG. 13 has first fusion bonded parts 231 having a configuration of a double circle. With the first fusion bonded parts 231 having such a configuration, the appearance can be enhanced, and the bond strength is increased. The cleaning element 240 shown in FIG. 14 has first fusion bonded parts 241 having a combined configuration of a plurality of circles with different diameters. With the first fusion bonded parts 241 having such a configuration, the appearance can be enhanced, and fine joining operation can be performed.

Figure 15:
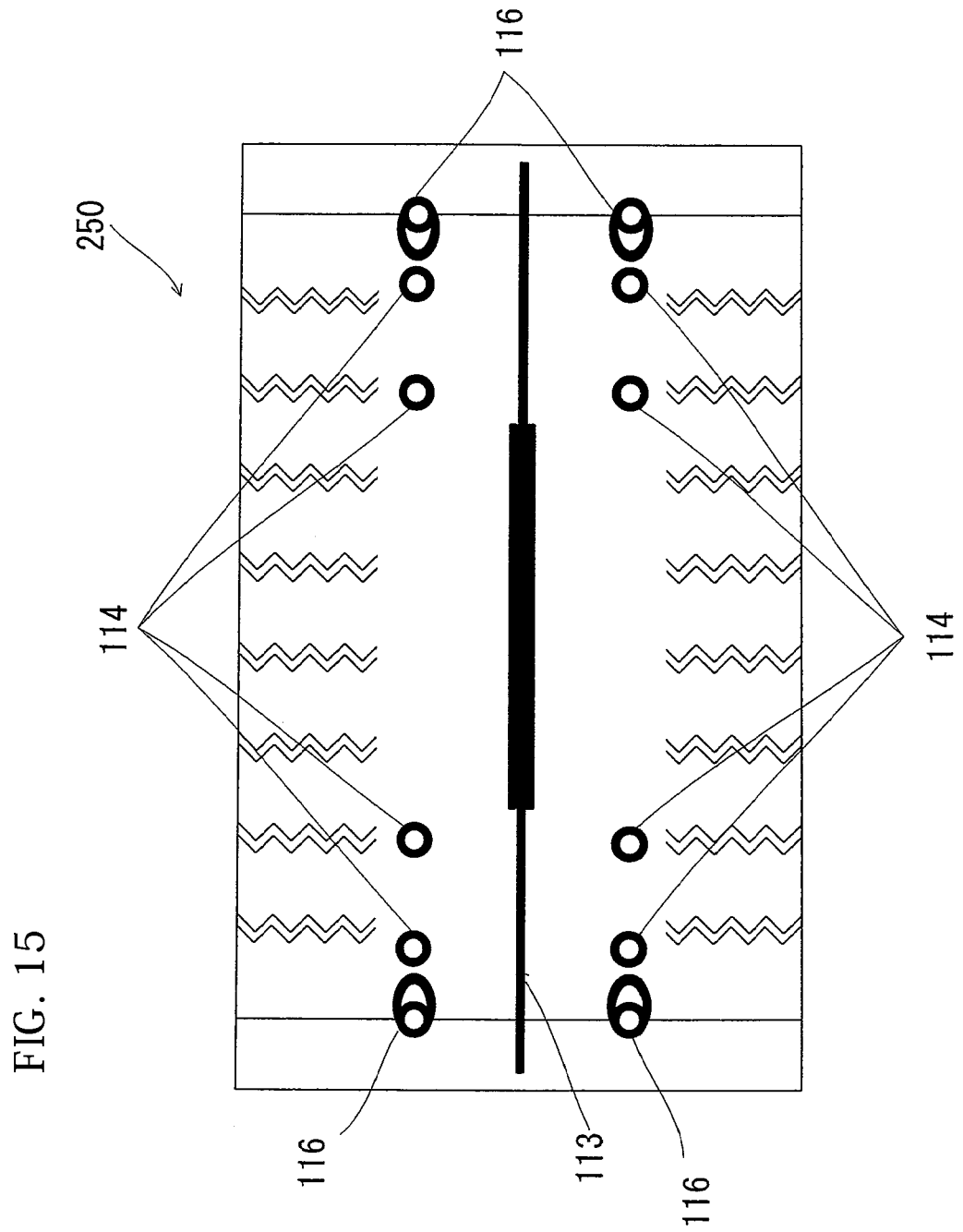
FIG. 15 is a plan view showing a cleaning element 250 according to a different embodiment.
Figure 16:
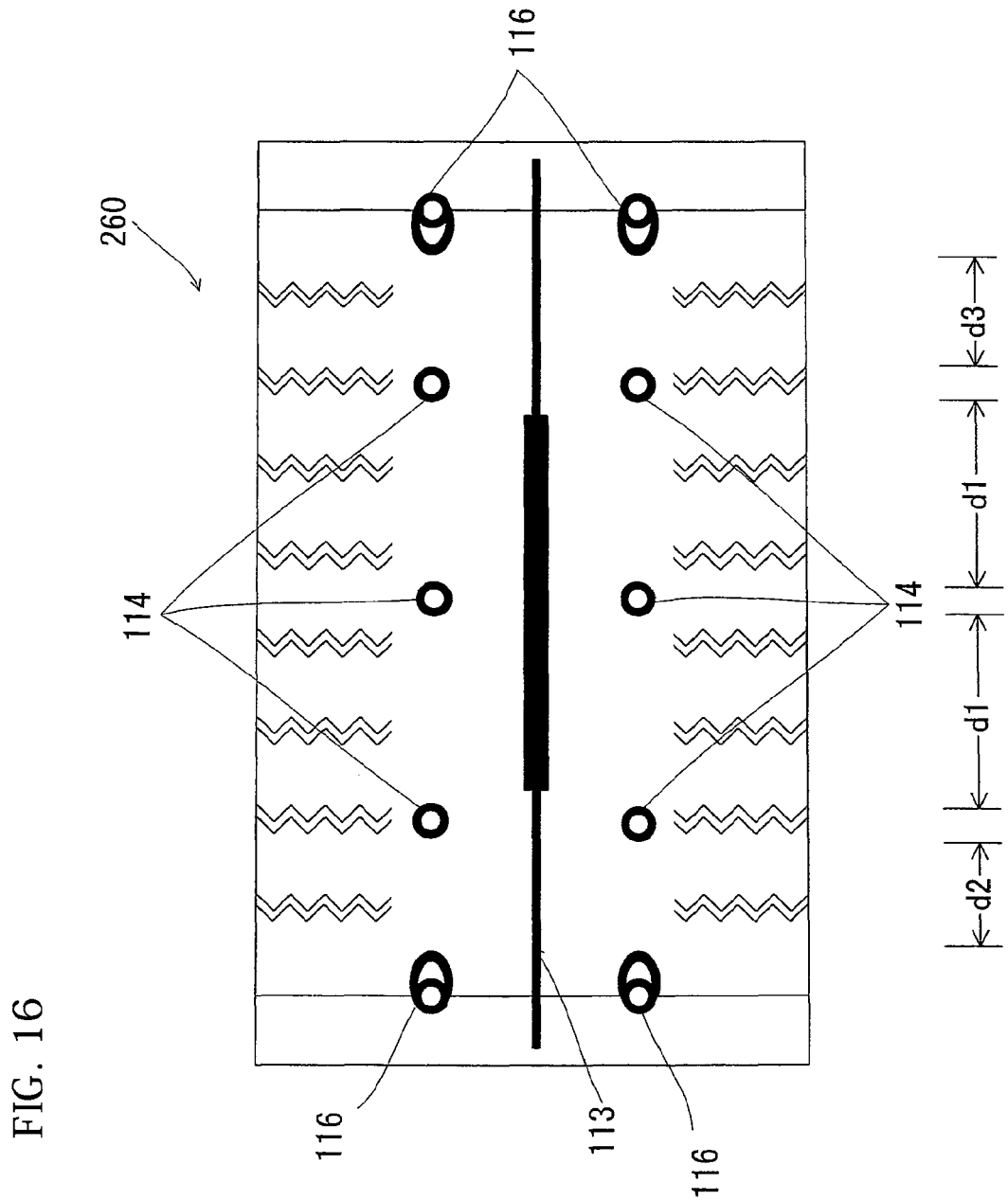
FIG. 16 is a plan view showing a cleaning element 260 according to a different embodiment.

The cleaning elements 250, 260 shown in FIGS. 15 and 16 have an increased number of the fusion bonded parts 114. Particularly, the cleaning element 260 shown in FIG. 16 has an additional fusion bonded part 114 between the two fusion bonded parts 114 which are provided on each side in the middle of the cleaning element 110 shown in FIG. 4. In this case, two pairs of the adjacent fusion bonded parts 114 are provided on each side in the middle of the cleaning element. Also in this construction, like in the cleaning element 110, preferably, the distance d1 between the adjacent fusion bonded parts 114 is longer than the distance d2 between the front fusion bonded parts 114 and 116 and the distance d3 between the rear fusion bonded parts 114 and 116. Further, when the first fusion bonded parts are increased in number, all of the first fusion bonded parts may not necessarily be provided on the same line.

Figure 17:
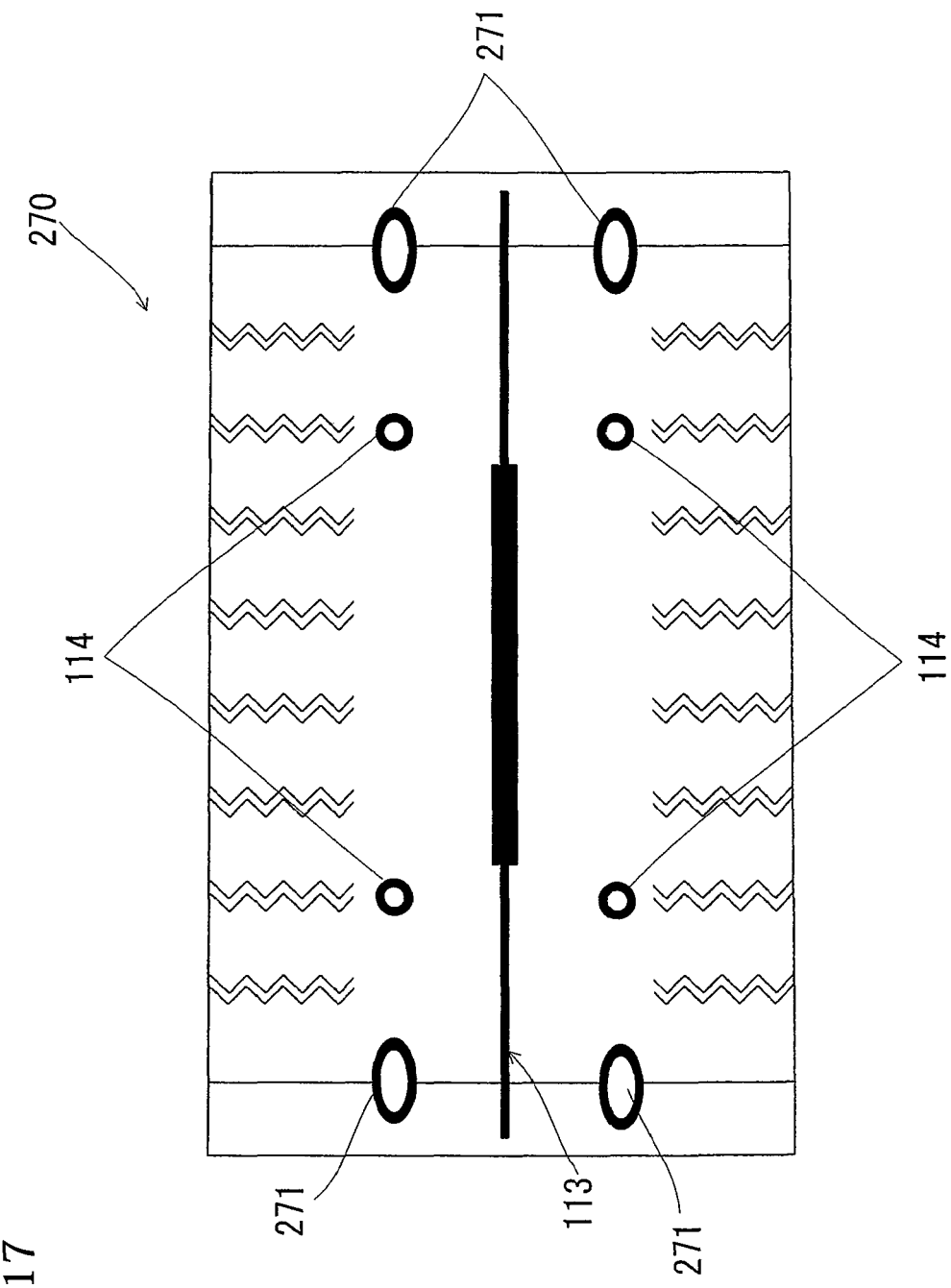
FIG. 17 is a plan view showing a cleaning element 270 according to a different embodiment.
Figure 18:
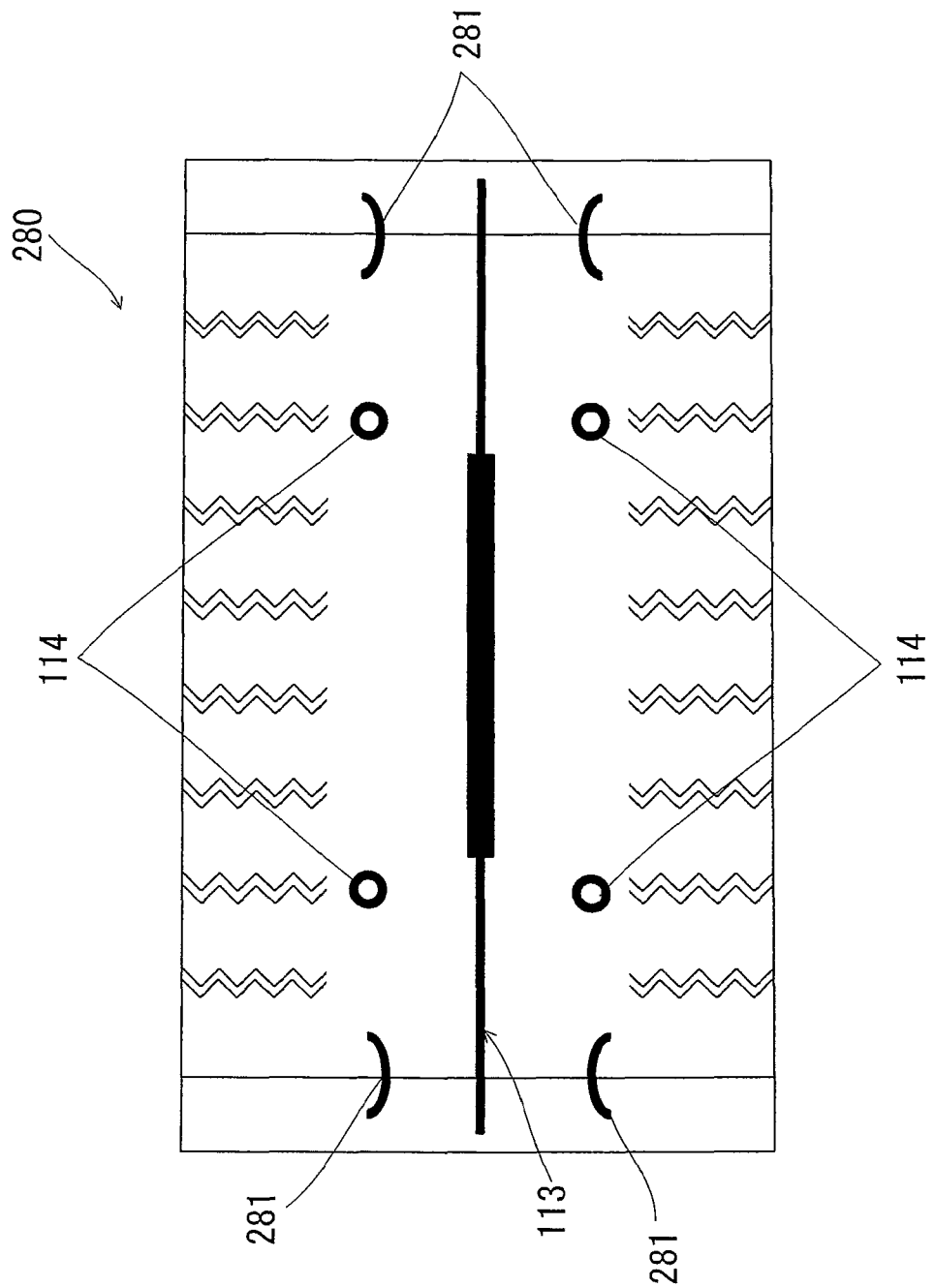
FIG. 18 is a plan view showing a cleaning element 280 according to a different embodiment.
Figure 19:
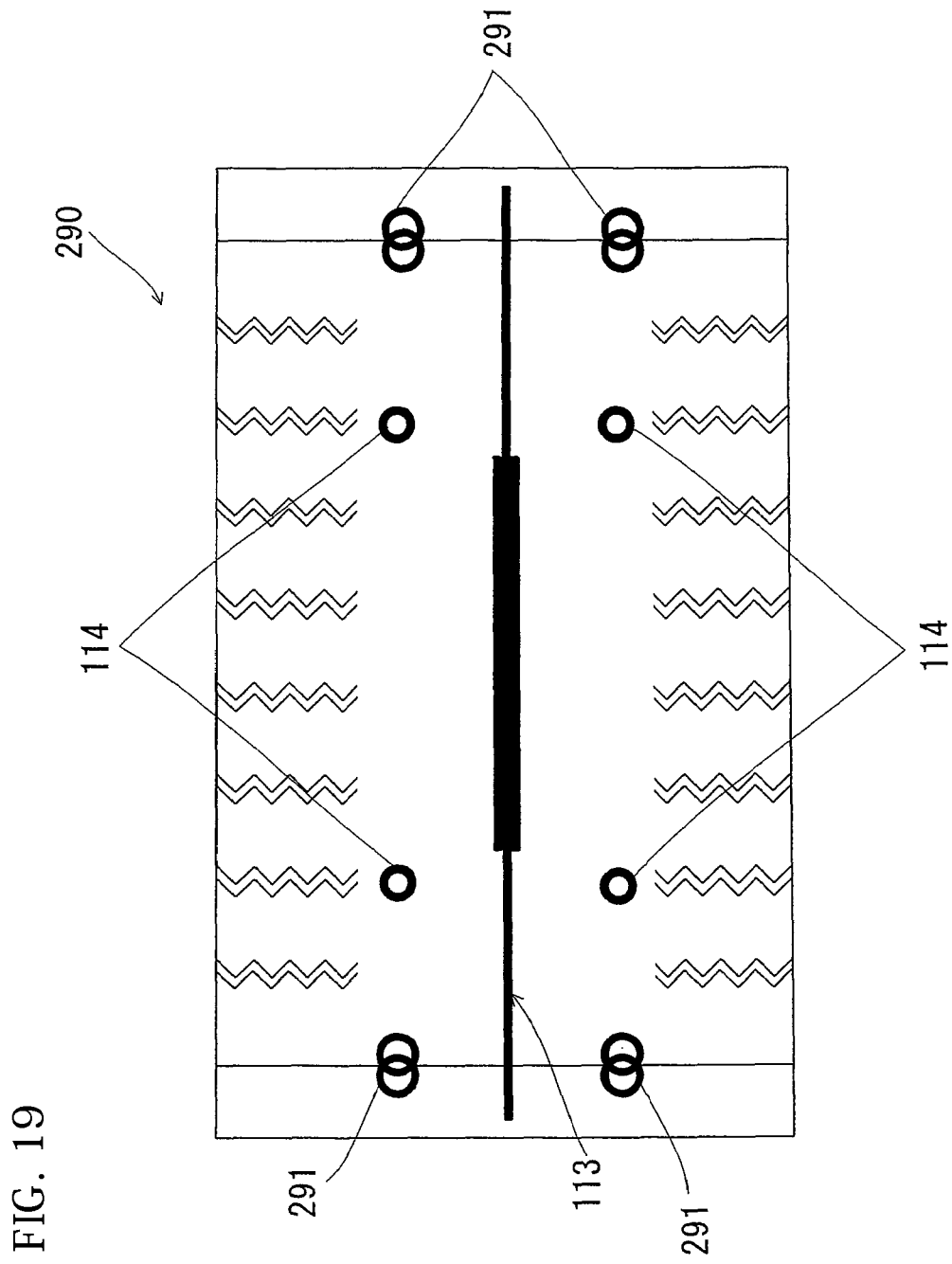
FIG. 19 is a plan view showing a cleaning element 290 according to a different embodiment.

Further, in this embodiment, the fusion bonded parts 116 are described as being shaped into a combined form of a circle (perfect circle) and an ellipse as shown in FIG. 4, it is essential for the fusion bonded parts to have at least an elongated portion extending in the longitudinal direction. The shape and the number of the fusion bonded parts can be changed as necessary. For example, the fusion bonded parts may be shaped as shown in FIGS. 17 to 19. Cleaning elements 270, 280, 290 shown in FIGS. 17 to 19 have substantially the same construction as the cleaning element 110 except for the shape or the number of the second fusion bonded parts.

The cleaning element 270 shown in FIG. 17 has second fusion bonded parts 271 having an elliptic shape. The cleaning element 280 shown in FIG. 18 has second fusion bonded parts 281 shaped to comprise only a part of an elliptic fusion bonded part. The cleaning element 290 shown in FIG. 19 has second fusion bonded parts 291 shaped into a combined form of two circular fusion bonded parts and elongated in the longitudinal direction. Also with the second fusion bonded parts 271, 281, 291, like the fusion bonded parts 116, the operation of inserting the holding plate 132 can be stabilized. Particularly, with the second fusion bonded parts 291, the joint area is increased, so that the bond strength is increased.

The invention claimed is:

1. A cleaning element, comprising:
   a fiber assembly having a plurality of fibers extending in a predetermined direction,
   a nonwoven fabric provided on the fiber assembly,
   a first fusion bonded part extending in a cross direction traversing said predetermined direction, and fusion-bonding the fiber assembly and the nonwoven fabric, and
   a plurality of second fusion bonded parts provided discontinuously in the cross direction and fusion-bonding the fiber assembly and the nonwoven fabric,
   wherein
   each of the second fusion bonded parts has a first area and a second area,
   a length in the predetermined direction from the first fusion bonded part to the first area is different from a length in the predetermined direction from the first fusion bonded part to the second area,
   a non-fusion bonded area is provided between the first area and the second area, and
   the first area and the second area are continuous to each other.

2. The cleaning element as defined in claim 1, wherein the non-fusion bonded area is enclosed by the first area and the second area.

3. The cleaning element as defined in claim 1, wherein the plurality of second fusion bonded parts has adjacent second fusion bonded parts in the cross direction, and the adjacent second fusion bonded parts are spaced from each other.

4. The cleaning element as defined in claim 3, wherein a first pair of the adjacent second fusion bonded parts are spaced from each other by a first predetermined distance, and a second pair of the adjacent second fusion bonded parts are spaced from each other by a second predetermined distance.

5. The cleaning element as defined in claim 4, wherein the first predetermined distance and the second predetermined distance have a same length.

6. The cleaning element as defined in claim 4, wherein the first predetermined distance and the second predetermined distance have different lengths.

7. The cleaning element as defined in claim 1, wherein each of the second fusion bonded parts includes at least one ring-shaped fusion bonded part fusion-bonding the fiber assembly and the nonwoven fabric in a thickness direction of the cleaning element.

8. A cleaning tool, comprising;
   a cleaning element; and
   a cleaning element holder having a grip to be held by a user for a cleaning operation, and a holding portion coupled to the grip,
   the cleaning element includes;

a fiber assembly having a plurality of fibers extending in a predetermined direction, a nonwoven fabric provided on the fiber assembly, a first fusion bonded part extending in a cross direction traversing said predetermined direction and fusion-bonding the fiber assembly and the nonwoven fabric, and a plurality of second fusion bonded parts provided discontinuously in the cross direction and fusion-bonding the fiber assembly and the nonwoven fabric, wherein each of the second fusion bonded parts has a first area and a second area, a length in the predetermined direction from the first fusion bonded part to the first area is different from a length in the predetermined direction from the first fusion bonded part to the second area, a non-fusion bonded area is provided between the first area and the second area, and the first area and the second area are continuous to each other.

9. The cleaning tool as defined in claim 8, wherein the non-fusion bonded area is enclosed by the first area and the second area.

10. The cleaning tool as defined in claim 8, wherein the plurality of second fusion bonded parts has adjacent second fusion bonded parts in the cross direction, and the adjacent second fusion bonded parts are spaced from each other.

11. The cleaning tool as defined in claim 10, wherein a first pair of the adjacent second fusion bonded parts are spaced from each other by a first predetermined distance, and a second pair of the adjacent second fusion bonded parts are spaced from each other by a second predetermined distance.

12. The cleaning tool as defined in claim 11, wherein the first predetermined distance and the second predetermined distance have a same length.

13. The cleaning tool as defined in claim 11, wherein the first predetermined distance and the second predetermined distance have different lengths.

14. The cleaning tool as defined in claim 8, wherein each of the second fusion bonded parts includes at least one ring-shaped fusion bonded part fusion-bonding the fiber assembly and the nonwoven fabric in a thickness direction of the cleaning element.

15. A cleaning element, comprising:

a fiber assembly having a plurality of fibers extending in a predetermined direction, a nonwoven fabric provided on the fiber assembly, a first fusion bonded part extending in a cross direction traversing said predetermined direction and fusion-bonding the fiber assembly and the nonwoven fabric, and a plurality of second fusion bonded parts provided discontinuously in the cross direction and fusion-bonding the fiber assembly and the nonwoven fabric, wherein each of the second fusion bonded parts has a first area and a second area, a length in the predetermined direction from the first fusion bonded part to the first area is different from a length in the predetermined direction from the first fusion bonded part to the second area, a first space area is provided between the first fusion bonded part and the first area in the predetermined direction, a second space area is provided between the first area and the second area in the predetermined direction, the first space area and the second space area define a strip non-forming area in which the nonwoven fabric has no strips, and the first area and the second area are continuous to each other.

16. The cleaning element as defined in claim 15, wherein the nonwoven fabric has a plurality of strips in a strip forming area of the nonwoven fabric.

17. The cleaning element as defined in claim 15, wherein the second space area defines a non-fusion bonded area between the first area and the second area.

18. The cleaning element as defined in claim 17, wherein the non-fusion bonded area is enclosed by the first area and the second area.

19. The cleaning element as defined in claim 15, wherein the plurality of second fusion bonded parts has adjacent second fusion bonded parts in the cross direction, and the adjacent second fusion bonded parts are spaced from each other.

20. The cleaning element as defined in claim 19, wherein a first pair of the adjacent second fusion bonded parts are spaced from each other by a first predetermined distance, and a second pair of the adjacent second fusion bonded parts are spaced from each other by a second predetermined distance.

21. The cleaning element as defined in claim 20, wherein the first predetermined distance and the second predetermined distance have a same length.

22. The cleaning element as defined in claim 20, wherein the first predetermined distance and the second predetermined distance have different lengths.

23. A cleaning tool, comprising;

a cleaning element; and a cleaning element holder having a grip to be held by a user for a cleaning operation, and a holding portion coupled to the grip, the cleaning element includes;

a fiber assembly having a plurality of fibers extending in a predetermined direction, a nonwoven fabric provided on the fiber assembly, a first fusion bonded part extending in a cross direction traversing said predetermined direction and fusion-bonding the fiber assembly and the nonwoven fabric, and a plurality of second fusion bonded parts provided discontinuously in the cross direction and fusion-bonding the fiber assembly and the nonwoven fabric, wherein each of the second fusion bonded parts has a first area and a second area, a length in the predetermined direction from the first fusion bonded part to the first area is different from a length in the predetermined direction from the first fusion bonded part to the second area, a first space area is provided between the first fusion bonded part and the first area in the predetermined direction, a second space area is provided between the first area and the second area in the predetermined direction, the first space area and the second space area define a strip non-forming area in which the nonwoven fabric has no strips, and the first area and the second area are continuous to each other.

24. The cleaning tool as defined in claim 23, wherein the nonwoven fabric has a plurality of strips in a strip forming area of the nonwoven fabric.

25. The cleaning tool as defined in claim 23, wherein a non-fusion bonded area is provided between the first area and the second area.

26. The cleaning tool as defined in claim 25, wherein the non-fusion bonded area is enclosed by the first area and the second area.

27. The cleaning tool as defined in claim 23, wherein the plurality of second fusion bonded parts has adjacent second fusion bonded parts in the cross direction, and the adjacent second fusion bonded parts are spaced from each other.

28. The cleaning tool as defined in claim 27, wherein a first pair of the adjacent second fusion bonded parts are spaced from each other by a first predetermined distance, and a second pair of the adjacent second fusion bonded parts are spaced from each other by a second predetermined distance.

29. The cleaning tool as defined in claim 28, wherein the first predetermined distance and the second predetermined distance have a same length.

30. The cleaning tool as defined in claim 28, wherein the first predetermined distance and the second predetermined distance have different lengths.

* * * * *